United States Patent
Oyama

(10) Patent No.: US 8,891,950 B2
(45) Date of Patent: Nov. 18, 2014

(54) MOVING BODY PHOTOGRAPHING SYSTEM, MOVING BODY PHOTOGRAPHING APPARATUS, MOVING BODY PHOTOGRAPHING METHOD AND MOVING BODY PHOTOGRAPHING PROGRAM

(71) Applicant: Hondo Motor Co., Ltd., Tokyo (JP)

(72) Inventor: Takahiro Oyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/875,478

(22) Filed: May 2, 2013

(65) Prior Publication Data

US 2013/0302022 A1    Nov. 14, 2013

(51) Int. Cl.
G03B 17/00    (2006.01)
G03B 15/00    (2006.01)
G03B 15/16    (2006.01)
H04N 5/232    (2006.01)

(52) U.S. Cl.
CPC ............... *G03B 15/00* (2013.01); *G03B 15/16* (2013.01); *H04N 5/23203* (2013.01)
USPC .......................................................... 396/57

(58) Field of Classification Search
CPC ..................................................... G03B 7/091
USPC ......................................................... 396/57
See application file for complete search history.

(56) References Cited

U.S. PATENT DOCUMENTS

2012/0162436 A1 * 6/2012 Cordell et al. ................ 348/158
2012/0196661 A1 * 8/2012 Snoddy et al. ..................... 463/9
2012/0252572 A1 * 10/2012 Ackley et al. ................... 463/29

FOREIGN PATENT DOCUMENTS

GB    WO-2011/001180 A1 *    1/2011    .............. G06F 17/30
JP               2006-30974 A       11/2006

* cited by examiner

*Primary Examiner* — Clayton E Laballe
*Assistant Examiner* — Dennis Hancock
(74) *Attorney, Agent, or Firm* — Birch, Stewart, Kolasch & Birch, LLP

(57) ABSTRACT

A moving body photographing system, apparatus, method and program wherein an individual can easily take a photograph while operating the moving body. A portable terminal moves together with a moving body and includes a moving body photographing module for inputting a condition when the moving body is to be photographed to reserve photographing. A wireless communication section and a moving body communication section transmit information representing the inputted condition and representing a position of the portable terminal to a management apparatus and a photographing apparatus. The management apparatus and the photographing apparatus include a wireless position measurement section for measuring a position of the moving body moving together with the portable terminal. A camera apparatus is provided for photographing the moving body in accordance with a condition inputted to the portable terminal based on the position information of the moving body measured by the moving body position measurement means.

15 Claims, 19 Drawing Sheets

FIG. 4(a)

CONFIRMATION OF THE
RESERVATION CONTENTS

| DATE | MM MONTH, DD DATE, YYYY YEAR |
| PLACE | ○○ MOUNTAIN PASS, △△ CURVE |
| COMPO-SITION | CURVE MIDDLE STAGE / SIDE |
| EFFECT | NORMAL |
| MOUNTING POSITION | AROUND METER |

THE CONTENTS OF THE ABOVE ARE RESERVED.
ARE YOU SURE?

YES            NO

FIG. 4(b)

YOUR RESERVATION NUMBER IS [XXXXX].

THANK YOU FOR YOUR RESERVATION.

WE ARE WAITING YOU.

PLEASE COME BY SAFE DRIVING ON THE DAY.

IF YOU COME NEAR THE PHOTOGRAPHING PLACE ON THE DAY, ATTACH/ACCOMMODATE YOUR SMARTPHONE TO/INTO A POSITION IN WHICH GPS POSITIONING IS POSSIBLE.

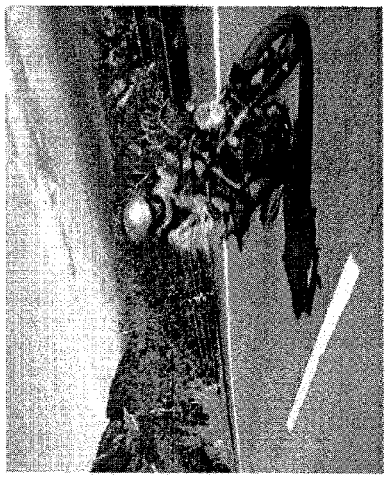
FIG. 10(b) LOW-SPEED SHUTTER
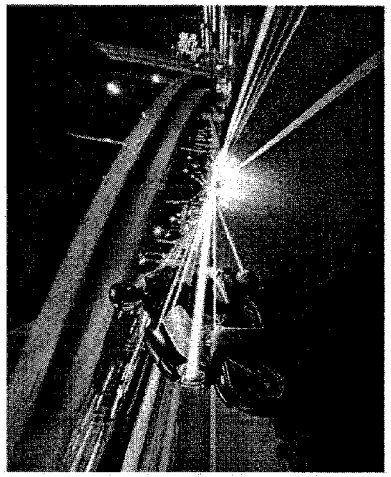
FIG. 10(d) LIGHT TRAIL
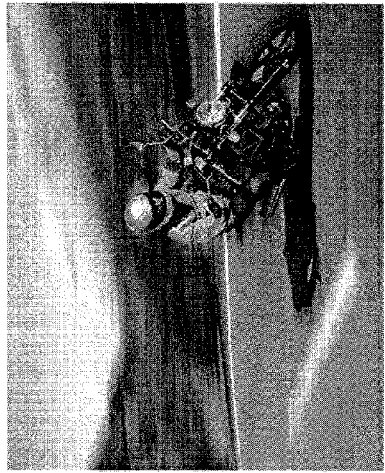
FIG. 10(a) PANNING
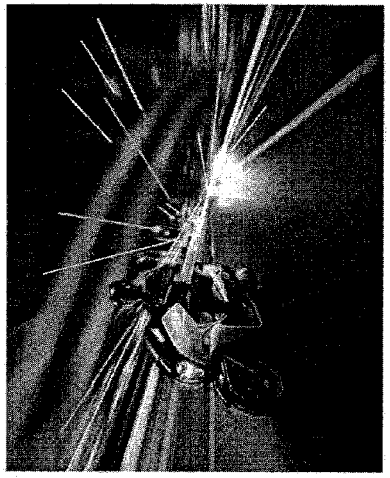
FIG. 10(c) ZOOM DURING EXPOSURE

MOVING BODY PHOTOGRAPHING SYSTEM, MOVING BODY PHOTOGRAPHING APPARATUS, MOVING BODY PHOTOGRAPHING METHOD AND MOVING BODY PHOTOGRAPHING PROGRAM

CROSS-REFERENCE TO RELATED APPLICATIONS

The present application claims priority under 35 USC 119 to Japanese Patent Application No. 2012-106845 filed May 8, 2012 the entire contents of which are hereby incorporated by reference.

BACKGROUND OF THE INVENTION

1. Field of the Invention

The present invention relates to a moving body photographing system, a moving body photographing apparatus, a moving body photographing method and a moving body photographing program for photographing a vehicle during operation or a moving body.

2. Description of Background Art

Conventionally, an owner (holder) of a motorcycle (saddle type vehicle) or an automobile as an example of a moving body sometimes takes a photograph of the owner's own vehicle for a topic of communication with friends or the like. However, when a motorcycle or an automobile is photographed, since a photographer frequently is the owner himself or herself, it is difficult to take a photograph in which the owner himself or herself and the owner's own vehicle are pictured together. Further, the owner of a motorcycle or the like has needs to take a photograph in a state in which the owner himself or herself travels riding on the owner's own vehicle. In this instance, for example, it is necessary to request another person such as a friend for cooperation to take the photograph. A great deal of time is required to take a photograph of the owner himself or herself who is operating the owner's own vehicle (motorcycle). In other words, there is a problem when a driver desires to take a photograph of the driver himself or herself as a photographic target wherein it is desired to photograph a vehicle during operation (moving).

As a method for photographing a vehicle during operation, for example, such a technique is disclosed in Japanese Patent Laid-Open No. 2006-309742 as a technique to be applied to a system for automatically controlling the speed of a traveling vehicle, namely, to a system such as the ORBIS. In the technique disclosed in Japanese Patent Laid-Open No. 2006-309742, a camera is installed in advance along a traveling direction of a vehicle. Then, the speed of the vehicle is measured, and the vehicle during operation is photographed at a certain timing, calculated based on the measured speed of the vehicle, at which the vehicle passes a spot wherein the camera is installed.

However, the problem described above cannot be solved by the technique disclosed in Japanese Patent Laid-Open No. 2006-309742.

SUMMARY AND OBJECTS OF THE INVENTION

The present invention has been made in view of the recognition of such a problem as described above. It is an object of an embodiment of the present invention to provide a moving body photographing system, a moving body photographing apparatus, a moving body photographing method and a moving body photographing program wherein an owner who desires to take a photograph can easily take a photograph of a vehicle during operation wherein the owner himself or herself is operating the moving body.

In order to solve the subject described above, according to an embodiment of the invention, there is provided a moving body photographing system wherein a portable terminal (10) moves together with a moving body and photographing means (20, 30) communicate with each other to photograph the moving body in a state in which the moving body is moving, wherein the moving body photographing system (1) includes: reservation means (100) for inputting a condition when the moving body is to be photographed to the portable terminal (10) to reserve photographing of the moving body in a state in which the moving body is moving by the moving body photographing system (1); and communication means (110, 140) for transmitting information representing the condition inputted to the portable terminal (10) and information representing a position of the portable terminal (10) to the photographing means (20, 30), wherein the photographing means (20, 30) includes moving body position measurement means (320) for measuring a position of the moving body moving together with the portable terminal (10). A camera apparatus (310) is provided for photographing the moving body in accordance with the condition inputted to the portable terminal (10) based on the position information of the moving body measured by the moving body position measurement means (320).

It is to be noted that the moving body includes general vehicles on which a driver rides across the vehicle body, and includes not only motorcycles but also three-wheeled (including also a vehicle having two front wheels and one rear wheel in addition to a vehicle having one front wheel and two rear wheels) or four-wheeled vehicles. Further, the condition includes any condition only if it can specify a date and a place for photographing (it can reserve photographing).

According to an embodiment of the present invention, the moving body photographing system (1) further includes moving body approach decision means (220) for deciding whether or not the portable terminal (10) exists within a range determined in advance based on the position information of the portable terminal (10).

According to an embodiment of the present invention, the portable terminal (10) includes wireless communication means; the moving body position measurement means (320) includes at least three or more access points (321) of a wireless signal; and the moving body position measurement means (320) transmits a wireless signal from the individual access points (321) and measures the position of the moving body based on some of the transmitted wireless signals and a response signal transmitted from the communication means (110, 140) in response to the wireless signals.

According to an embodiment of the present invention, the wireless communication by the wireless communication means is wireless LAN communication; and a measurement method for the moving body is wireless LAN position measurement.

According to an embodiment of the present invention, the portable terminal (10) further includes position information acquisition means (120) for acquiring position information at present of the portable terminal (10); the communication means (110, 140) transmits the position information of the portable terminal (10) outputted from the position information acquisition means (120) to the moving body approach decision means (220); the photographing means (20, 30) further includes management means (200) for controlling startup of the camera apparatus (310) and the moving body position measurement means (320); the moving body approach decision means (220) decides whether or not the portable terminal (10) exists within the range determined in advance from the camera apparatus (310) based on the position information at present of the portable terminal (10) transmitted thereto and information of the position at which the camera apparatus (310) is installed; and the management means (200) starts up the camera apparatus (310) and the moving body position measurement means (320) based on a result of the decision by the moving body approach decision means (220).

According to an embodiment of the present invention, the portable terminal (10) further includes photographing condition setting means (100) for inputting photographing condition information including one or both of a composition and an effect when the moving body is to be photographed; and the communication means (110, 140) transmits the photographing condition information inputted to the photographing condition setting means (100) to the photographing means (20, 30).

According to an embodiment of the present invention, the photographing means (20, 30) further includes photographing controlling means (300) for controlling photographing by the camera apparatus (310); the camera apparatus (310) is installed such that a photographing direction can be varied under the control of the photographing controlling means (300); and the photographing controlling means (300) controls, based on the photographing condition information transmitted thereto, the photographing by the camera apparatus (310) so as to photograph the moving body by a photographing method in accordance with the direction suitable for the composition when the moving body is to be photographed and the effect.

According to an embodiment of the present invention, the photographing controlling means (300) outputs, based on the position information of the moving body measured by the moving body position measurement means (320), a shutter timing signal for causing the camera apparatus (310) to start photographing at a timing before the position of the moving body comes to a position at which the composition coincides with the composition for photographing of the moving body; and the camera apparatus (310) successively takes a plurality of photographs for a period of time until a predetermined number of photographs are taken or for a period of time determined in advance after the shutter timing signal is inputted.

According to an embodiment of the present invention, there is provided a moving body photographing apparatus (20, 30) which communicates with a portable terminal (10) that moves together with a moving body to photograph the moving body in a state wherein the moving body is moving, including moving body position measurement means (320) for measuring a position of the moving body that moves together with the portable terminal (10); and a camera apparatus (310) for photographing the moving body in accordance with a condition when the moving body is to be photographed transmitted from the portable terminal (10) based on position information of the moving body measured by the moving body position measurement means (320).

According to an embodiment of the present invention, there is provided a moving body photographing method wherein a portable terminal (10) that moves together with a moving body and photographing means (20, 30) communicate with each other to photograph the moving body in a state wherein the moving body is moving. The moving body photographing method includes a reservation step wherein by inputting a condition when the moving body is to be photographed to the portable terminal (10), reservation means (100) provided in the portable terminal (10) reserves photographing of the moving body in a state in which the moving body is moving by a moving body photographing system (1); a communication step in which communication means (110, 140) provided in the portable terminal (10) transmits information representative of the condition inputted to the terminal (10) to the photographing means (20, 30); a moving body position measurement step in which moving body position measurement means (320) provided in the photographing apparatus (20, 30) measures a position of the moving body which moves together with the portable terminal (10); and a photographing step in which a camera apparatus (310) provided in the photographing means (20, 30) photographs the moving body in accordance with the condition inputted to the portable terminal (10) based on the position information of the moving body measured by the moving body position measurement means (320).

According to an embodiment of the present invention, there is provided a moving body photographing program for causing a portable terminal (10) that moves together with a moving body and photographing means (20, 30) to communicate with each other to photograph the moving body in a state wherein the moving body is moving, the program including: a reservation step in which by inputting a condition when the moving body is to be photographed to the portable terminal (10), reservation means (100) provided in the moving body photographing program reserves photographing of the moving body in a state in which the moving body is moving by a moving body photographing system (1); and a communication step of transmitting information representative of the condition inputted to the terminal (10) to the photographing means (20, 30).

According to an embodiment of the present invention, a photograph in which a user who desires a photograph in such a moving state wherein the user himself or herself is operating the moving body can be taken easily and with certainty.

According to an embodiment of the present invention, a situation wherein the moving body on which the user himself or herself who desires a photograph is operating the moving body and is approaching a photographing range can be decided.

According to an embodiment of the present invention, the accuracy in position measurement can be improved by utilizing a measurement of the position of the moving body using a wireless signal of a wireless LAN or the like and the place of the photograph can be set to an arbitrary place within the photographing range.

According to an embodiment of the present invention, identification of the moving body and position measurement of the moving body can be carried out easily at a comparatively low cost.

According to an embodiment of the present invention, the distance to the camera apparatus can be decided based on the position information acquired utilizing a GPS apparatus or the like provided in the portable terminal, and the camera apparatus and the moving body position measurement means can be started up in advance. Therefore, energy required for operation of the moving body photographing apparatus can be suppressed.

According to an embodiment of the present invention, a condition upon photographing can be set such that a photograph having a composition and an effect conforming to the liking is taken.

According to an embodiment of the present invention, the possibility that the taking of a photograph may result in failure can be reduced and choices for a photograph to be finally selected by the user can be increased.

According to an embodiment of the present invention, a photograph wherein a user who desires a photograph in such a moving state wherein the user himself or herself is operating the moving body can be taken easily and with certainty.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a) and 4(b) are views illustrating an example of a case wherein preserved and set information is confirmed when the moving body photographing system of the present embodiment is utilized;

FIGS. 10(a) to 10(d) are views illustrating an example of an effect of a photograph taken utilizing the moving body photographing system of the present embodiment;

DETAILED DESCRIPTION OF THE PREFERRED EMBODIMENTS

Figure 1:
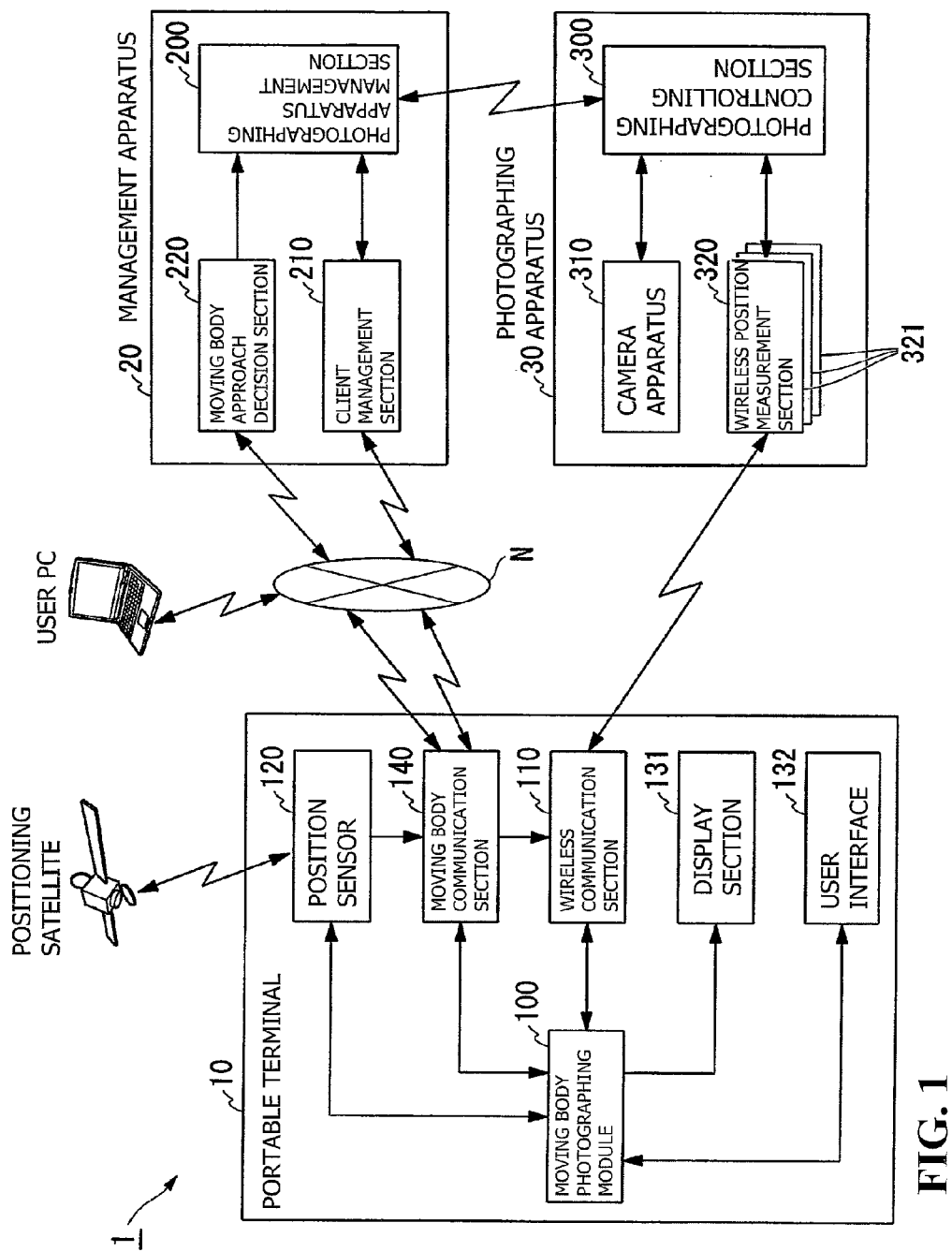
FIG. 1 is a block diagram showing an outline of a system configuration of a moving body photographing system according to an embodiment of the present invention.

FIG. 1 is a block diagram showing an outline of a system configuration of a moving body photographing system according to an embodiment of the present embodiment. The moving body photographing system 1 is configured from a portable terminal 10, a management apparatus 20 and a photographing apparatus 30. It is to be noted that, in the following description, a case is described in which an owner (holder) of a saddle type vehicle (hereinafter referred to as "motorcycle") utilizes the moving body photographing system 1 of the present embodiment. Accordingly, it is assumed that a utilizer (user) of the moving body photographing system 1 of the present embodiment is a rider of a motorcycle.

The portable terminal 10 is a portable terminal having both a function as a portable telephone set utilizing an existing mobile communication network and another function as a portable information terminal (PDA: Personal Digital Assistant), namely, a smartphone. The portable terminal 10 includes an application having a client function of the moving body photographing system 1 (the application is hereinafter referred to as "moving body photographing application"). The moving body photographing application is a software module for providing functions such as setting for photographing in the moving body photographing system 1 and confirmation and downloading of a photograph taken of a user of the portable terminal 10, namely, to a rider of a motorcycle. It is to be noted that the functions of the moving body photographing system 1 are not limited to those provided by the software module but may be provided by a hardware module for implementing the functions of the moving body photographing application.

The user of the moving body photographing system 1 starts up the moving body photographing application and transmit a reservation and setting to photograph using the moving body photographing system 1 to the management apparatus 20. Then, the user would carry the portable terminal 10 in a state wherein the moving body photographing application is started up and with an operation of the motorcycle at a place wherein a camera is placed. Further, the user would confirm a photograph taken by the moving body photographing system 1 and transmitted thereto from the management apparatus 20 using the moving body photographing application and acquires the photographic image by downloading.

It is to be noted that a reservation and setting of the photograph by the moving body photographing application and determining the photograph to be actually acquired can be carried out not only at a destination wherein the user is operating the motorcycle but also by starting up the moving body photographing application, for example, using a personal computer (hereinafter referred to as "PC") which the user has.

The management apparatus 20 controls the entire moving body photographing system 1. The management apparatus 20 receives the reservation and setting of photographing transmitted thereto from the portable terminal 10 and controls the photographing apparatus 30 in accordance with the received reservation and setting of the photographing. Further, the management apparatus 20 transmits a photograph indicative of a state wherein the user is operating the motorcycle and is photographed by the photographing apparatus 30 to the portable terminal 10.

The photographing apparatus 30 actually carries out the taking of a photograph under the control of the management apparatus 20. Then, the taken photograph is outputted to the management apparatus 20. The management apparatus 20 and the photographing apparatus 30 are connected to each other through a network environment such as, for example, the Internet or a LAN (Local Area Network).

Hereinafter, each of the components in the moving body photographing system 1 is described in more detail. As shown in FIG. 1, the portable terminal 10 includes a moving body photographing module 100, a wireless communication section 110, a position sensor 120, a display section 131, a user interface 132 and a moving body communication section 140. Meanwhile, the management apparatus 20 includes a photographing apparatus management section 200, a client management section 210, and a moving body approach decision section 220. The photographing apparatus 30 further includes a photographing controlling section 300, a camera apparatus 310 and a wireless position measurement section 320.

The moving body photographing module 100 executes the moving body photographing application. The moving body photographing module 100 controls the wireless communication section 110 and the position sensor 120 in operation of the moving body photographing system 1. Further, the moving body photographing module 100 carries out acquisition of data of information inputted to the user interface 132 and outputting of information and image data to be displayed on the display section 131 in operation of the moving body photographing system 1. It is to be noted that, in the following description, the present embodiment is described under the assumption that the moving body photographing application is being executed by the moving body photographing module 100 and the moving body photographing application carries out the controlling of the components of the portable terminal 10 and the inputting and the outputting of information (data) to and from the components.

The display section 131 is provided in the portable terminal 10. The display section 131 displays a screen image inputted thereto from the moving body photographing application (moving body photographing module 100) to present information of the moving body photographing application, namely, information of the utilized moving body photographing system 1.

The user interface 132 is an operation inputting section to which various kinds of operations are inputted by the user and which is provided on the portable terminal 10. The user interface 132 passes information of an operation to the portable terminal 10 carried out by the user and information inputted to the portable terminal 10, namely, information of the input data to the moving body photographing application, to the moving body photographing application (moving body photographing module 100). While the user interface 132 can be configured from buttons provided separately from the display section 131, in the following description, the present embodiment is described under the assumption that the display section 131 is a touch panel type interface including a pressure sensor and configured by combining the display section 131 and the pressure sensor. Accordingly, the description is given under the assumption that the user carries out a touching (depressing, sliding or the like) operation for the screen of the display section 131 of the portable terminal 10 thereby to carry out transmission and reception of information to and from the moving body photographing application from the user interface 132.

The position sensor 120 is a position sensor such as a GPS (Global Positioning System) apparatus provided in the portable terminal 10. Further, the position sensor 120 may be configured from an apparatus for autonomously grasping movement by a gyroscopic sensor or a combination of the apparatus and sensor just described. The position sensor 120 acquires position information at present of the portable terminal 10, namely, of the motorcycle, in response to an instruction from the moving body photographing application (moving body photographing module 100) and outputs the acquired position information at present of the motorcycle to the moving body communication section 140 and the wireless communication section 110.

The moving body communication section 140 carries out communication with an existing mobile communication network. The moving body communication section 140 transmits information relating to the utilization of the moving body photographing system 1 such as a reservation and setting of the photograph inputted to the moving body photographing application and position information at present of the motorcycle inputted from the position sensor 120 to the management apparatus 20 in response to an instruction from the moving body photographing application (moving body photographing module 100). Further, the moving body communication section 140 receives information of a state of the photographing apparatus 30 transmitted thereto from the management apparatus 20 and data (image data) of a photograph of the motorcycle taken by the moving body photographing system 1. Then, the moving body communication section 140 outputs the received information of the controlling state of the photographing apparatus 30 and the image data to the moving body photographing application (moving body photographing module 100).

The wireless communication section 110 is a wireless communication section provided in the portable terminal 10 for carrying out transmission and reception of a wireless signal through a wireless LAN or the like. Further, when a transmission signal outputted from the wireless position measurement section 320 is received, the wireless communication section 110 transmits a response signal representing a response to the received transmission signal in response to an instruction from the moving body photographing application (moving body photographing module 100). It is to be noted that the portable terminal 10 may carry out transmission and reception to and from the moving body communication section 140 not by mobile communication but by wireless communication if it exists within an area within which wireless LAN communication separate from the mobile communication can be utilized.

The client management section 210 carries out communication with the moving body communication section 140 of the portable terminal 10. The client management section 210 receives information of a reservation and setting of the photograph and so forth transmitted thereto from the moving body photographing application through the moving body communication section 140 and outputs the received information to the photographing apparatus management section 200. Further, the client management section 210 transmits a response to the reservation and setting of photographing inputted from the photographing apparatus management section 200, a controlling state regarding the photographing apparatus 30 and image data of a taken photograph to the moving body photographing application through the moving body communication section 140.

The moving body approach decision section 220 carries out communication with the moving body communication section 140 of the portable terminal 10. The moving body approach decision section 220 receives position information at present of a motorcycle transmitted thereto through the moving body communication section 140 and calculates the distance between the position at which the photographing apparatus 30 is installed and the position at present of the motorcycle based on the received position information at present of the motorcycle. Then, if the distance between the position at which the photographing apparatus 30 is installed and the position at present of the motorcycle is within a predetermined distance, then the moving body approach decision section 220 outputs information representing approaching of the motorcycle to the photographing apparatus 30 to the photographing apparatus management section 200.

It is to be noted that, in order to cope with such a case that the periphery of the photographing apparatus 30 is outside the range of a mobile communication network or with a like case, when the motorcycle comes to a place wherein it is predicted to approach the photographing apparatus 30 within the mobile communication network, the moving body approach decision section 220 may output this information to the photographing apparatus management section 200. The place at which it is predicted to approach the photographing apparatus 30 may be a specific intersection of a road toward the photographing apparatus 30, and such places may be set in advance together with the installation place of the photographing apparatus 30.

The photographing apparatus management section 200 controls startup of the photographing apparatus 30. If information representing that the motorcycle is approaching the photographing apparatus 30 is inputted from the moving body approach decision section 220, then the photographing apparatus management section 200 sends a signal to the photographing controlling section 300 to start up the photographing apparatus 30. Then, the photographing apparatus management section 200 outputs information of a reservation and setting of photographing inputted from the client management section 210 to the photographing apparatus 30. Further, the photographing apparatus management section 200 acquires image data of a motorcycle photographed by the photographing apparatus 30 and outputs the acquired image data to the client management section 210. Thereafter, the photographing apparatus management section 200 controls the photographing apparatus 30 to a standby state.

The photographing controlling section 300 controls taking of a photograph of an actual motorcycle. The photographing controlling section 300 normally is in a standby state wherein the power consumption is suppressed to a minimum level. If the photographing controlling section 300 is started up by the photographing apparatus management section 200, then it starts up the camera apparatus 310 and the wireless position measurement section 320 based on such information as a reservation, setting and so forth of photographing inputted from the photographing apparatus management section 200 to make preparations for photographing. Then, the photographing controlling section 300 outputs a photographing timing signal (hereinafter referred to as shutter signal) to the camera apparatus 310 for causing the camera apparatus 310 to carry out actual photographing based on information of a result of position measurement inputted from the wireless position measurement section 320. It is to be noted that the photographing controlling section 300 outputs a shutter signal to the camera apparatus 310 at a timing earlier by a period of time determined in advance than a timing at which an optimum composition is reached and which is calculated based on the information of the result of position measurement inputted from the wireless position measurement section 320. The photographing controlling section 300 acquires image data of the motorcycle photographed by the camera apparatus 310 and outputs the acquired image data to the photographing apparatus management section 200.

The camera apparatus 310 is a camera that takes a photograph of an actual motorcycle in response to a shutter signal inputted thereto from the photographing controlling section 300. If a shutter signal is inputted from the photographing controlling section 300, then the camera apparatus 310 successively takes a plurality of photographs by a number determined in advance or for a period of time determined in advance after the timing at which the shutter signal is inputted. This successive taking of photographs is carried out, for example, after every 0.1 second, for periods of time of one second before and after the point of time at which an optimum composition is to be obtained. Then, the camera apparatus 310 outputs the image data of the taken photographs of the motorcycle to the photographing controlling section 300.

The wireless position measurement section 320 includes a plurality of wireless LAN access points 321 and measures the position of a motorcycle by known wireless LAN position measurement. Then, the wireless position measurement section 320 outputs measured position information of the motorcycle after the point in time at which the motorcycle enters a range (hereinafter referred to as "photographing region") within which the position of the motorcycle can be measured by wireless LAN position measurement to the photographing controlling section 300. It is to be noted that not the radio LAN position measurement but any other wireless position measurement technique may be applied if it allows the portable terminal 10 of the user to communicate a unique identification signal with the outside so that the position of the portable terminal 10 can be measured.

The wireless LAN access points 321 have known position information. It is to be noted that, within the photographing region of the camera apparatus 310, at least three or more wireless LAN access points 321 are installed.

If the wireless position measurement section 320 is started up by the photographing controlling section 300, then it transmits a wireless signal from the wireless LAN access points 321 into the photographing region. Thereafter, if the portable terminal 10 in which the moving body photographing application is started up, namely, a motorcycle on which a user who utilizes the moving body photographing system 1 rides, enters the photographing region, then the wireless communication section 110 of the portable terminal 10 receives wireless signals transmitted simultaneously from at least three or more wireless LAN access points 321 and outputs the received wireless signals to the moving body photographing application.

If the received wireless signals are correct wireless signals transmitted from the moving body photographing system 1, then the moving body photographing application transmits a response signal to the received wireless signals to the at least three or more wireless LAN access points 321 from which the wireless signals have been sent through the wireless communication section 110. Then, each wireless LAN access point 321 receives the response signal transmitted from the portable terminal 10. The wireless position measurement section 320 calculates, namely, measures, the position of the motorcycle based on time differences with which the response signal is received by the wireless LAN access points 321 and the position information of the wireless LAN access points 321. Then, the wireless position measurement section 320 outputs the calculated position of the motorcycle as information of a result of the position measurement to the photographing controlling section 300. This wireless position measurement is wireless LAN position measurement of calculating the position of the target portable terminal 10 based on time differences of arrival (TDOA: Time Difference of Arrival). By utilization of the wireless LAN position measurement, the photographing region can be selected in accordance with a will of the installation person of the photographing apparatus 30. In addition, the position of a moving body can be measured with a high degree of accuracy.

It is to be noted that the configuration of the wireless position measurement section 320 is not limited to that wherein position information of a motorcycle is outputted to the photographing controlling section 300 but may be such that any information is used if it is possible to use the information to allow the photographing controlling section 300 to decide a timing of a shutter signal to be outputted to the camera apparatus 310. For example, the wireless position measurement section 320 may be configured such that it decides, for example, when any of the wireless LAN access points 321 receives a response signal transmitted from the portable terminal 10, that a motorcycle has entered the photographing region and outputs a signal representing that a motorcycle has entered the photographing region to the photographing controlling section 300. In this instance, the photographing controlling section 300 outputs a shutter signal to the camera apparatus 310 at a timing determined in advance. Also it is possible for the wireless position measurement section 320 to instruct the camera apparatus 310 to photograph moving pictures within a period within which the motorcycle remains in the photographing region in which the camera apparatus 310 can photograph the motorcycle.

Figure 2:
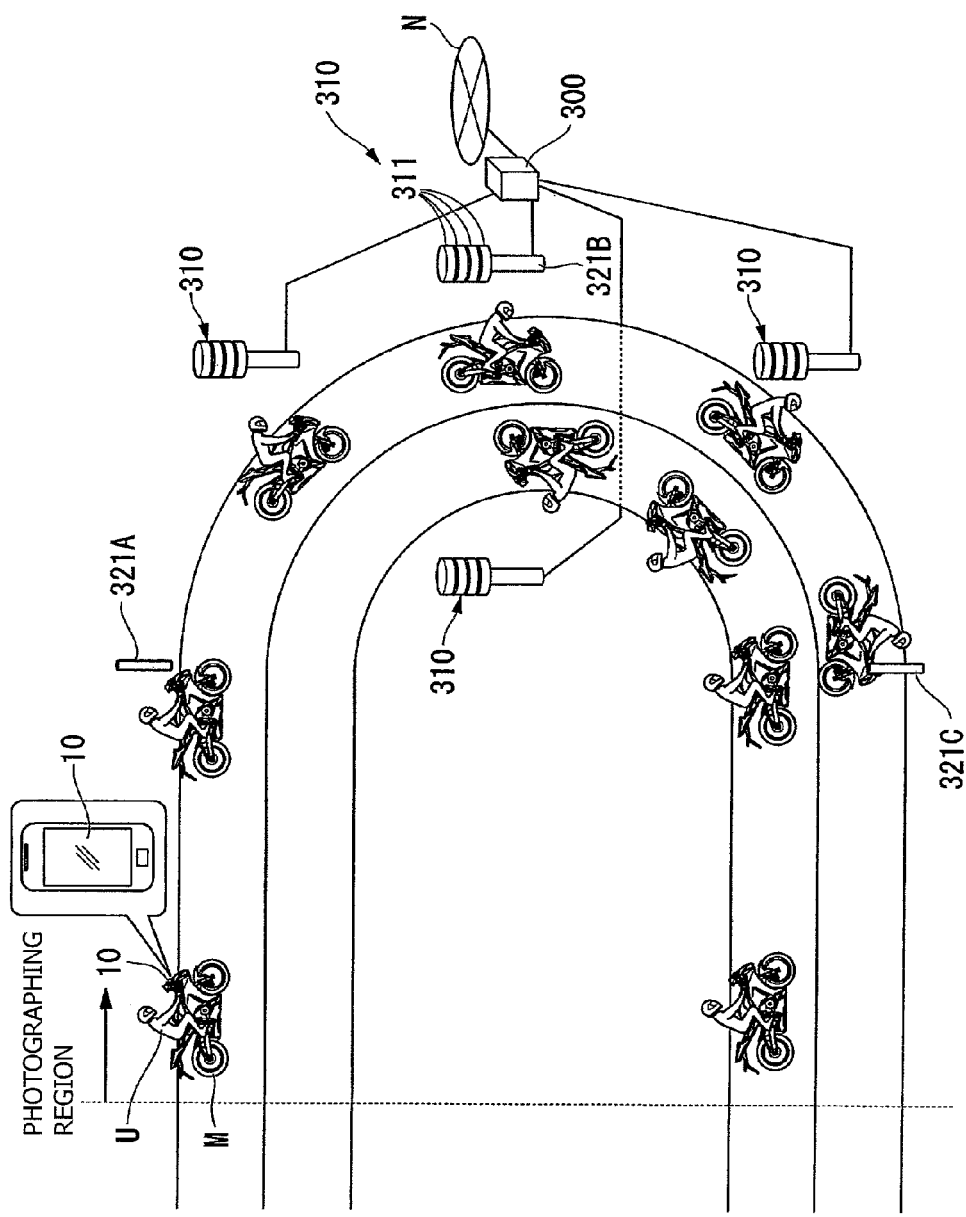
FIG. 2 is a view showing an example of a state in which a photographing apparatus is installed in the moving body photographing system of the present embodiment.

Hereinafter the installation of the photographing apparatus 30 in the moving body photographing system 1 is described. FIG. 2 is a view illustrating an example of a state wherein the photographing apparatus 30 is installed in the moving body photographing system 1 of the present embodiment. In FIG. 2, the photographing apparatus 30 is installed at a curve in the road. FIG. 2 further illustrates a manner in which the portable terminal 10 is attached to a motorcycle M in the proximity of a meter by the user. The photographing apparatus 30 shown in FIG. 2 includes more than three wireless LAN access points 321 (only the access points 321A, 321B and 321C are shown), and the camera apparatus 310 is provided. The camera apparatus 310 includes four camera cases 311 attached to the uppermost portion of a pillar (pole) erected on the ground at the point at which the wireless LAN access point 321B is installed is provided. It is to be noted that, in the present embodiment, four camera apparatus 310 are provided as shown in FIG. 2.

Each camera case 311 accommodates a camera in the inside thereof and can change the direction in which the camera apparatus 310 is to photograph by turning the camera upwardly, downwardly, leftwardly and/or rightwardly under the control of the photographing controlling section 300 connected to the Internet N. Further, the camera apparatus 310 includes a zoom function and a continuous shooting function controlled by the photographing controlling section 300. By this configuration, the photographing apparatus 30 can take a photograph in a composition in accordance with a reservation and setting of photographing inputted to the moving body photographing application by the user. In FIG. 2, the photographing region is the region to the right side of the broken line. Since this photographing region is a range within which wireless LAN position measurement can be carried out, it can be expanded arbitrarily.

If the user carries the portable terminal 10, which is in a state in which the moving body photographing application is started up, and moves with a motorcycle, then position information at present of the motorcycle acquired by the position sensor 120 is transmitted to the moving body approach decision section 220 through the moving body communication section 140. Then, when the motorcycle comes near to the spot at which the photographing apparatus 30 is installed, the photographing apparatus 30 is started up and wireless LAN position measurement and photographing are started at a point in time at which the motorcycle enters the photographing region of the camera apparatus 310. Then, the wireless LAN position measurement and photographing are ended when the motorcycle goes out from the photographing region of the camera apparatus 310.

It is to be noted that, in the moving body photographing system 1, in order to satisfy a request for successive photographing from an unspecified number of users or for various manners of photographing of users, two or more camera cases 311 are preferably installed at one photographing position. This makes it possible to take a photograph of an effect in accordance with a reservation and the setting of the photographing inputted to the moving body photographing application by the user. For example, photographs of various effects can be obtained by a plurality of camera apparatus 310 individually photographing a motorcycle at timings displaced from each other. Further, it is possible to cope with such a situation wherein a plurality of users who utilize the moving body photographing system 1 pass a spot wherein the photographing apparatus 30 is installed at substantially the same time. In FIG. 2, an example is shown wherein four camera cases 311 are provided.

Further, in the moving body photographing system 1, preferably the individual camera apparatus 310 take a plurality of photographs by successive photographing. This makes it easy to avoid failure in taking a photograph. Further, the choices can be increased when a user actually determines a photograph to be acquired.

Now, an example wherein the moving body photographing system 1 is utilized is described in accordance with the passage of time when a user travels with a motorcycle. It is to be noted that the reservation and setting of the photographing by the moving body photographing application and determination of a photograph to be acquired actually can be carried out by a PC or the like owned by the user. However, in the following description, a case is described in which the reservation and setting of the photographing by the moving body photographing application and the determination of a photograph to be acquired actually can be carried out by a PC or the like are carried out on the portable terminal 10. Further, wireless communication with the client management section 210 and the moving body approach decision section 220 in the management apparatus 20 or the wireless LAN access point 321 provided in the wireless position measurement section 320 in the photographing apparatus 30 is carried out by the wireless communication section 110 in accordance with an instruction of the moving body photographing application. However, the following description is given under the assumption that such wireless communication is carried out by the moving body photographing application.

Figure 3A:
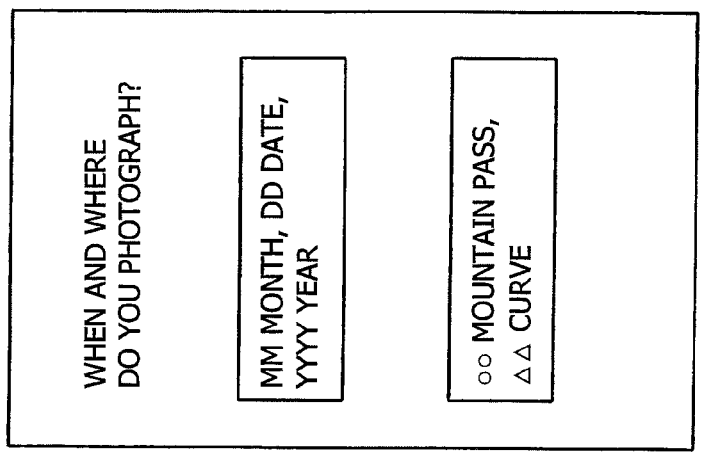
FIGS. 3(a) to 3(c) include views illustrating an example of information set when the moving body photographing system of the present embodiment is utilized.
Figure 3B:
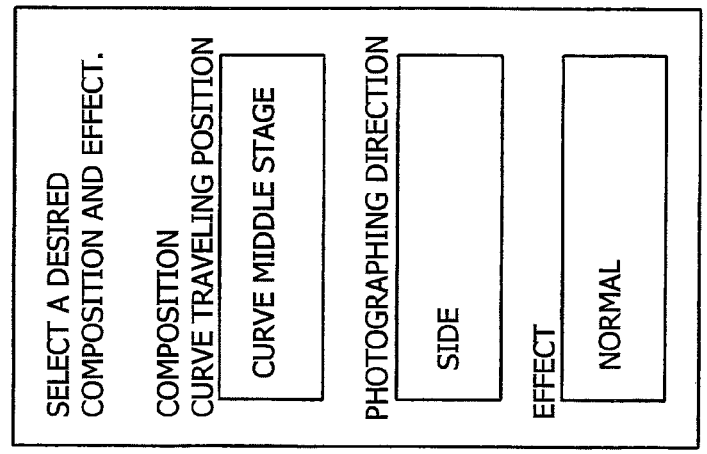
Figure 3C:
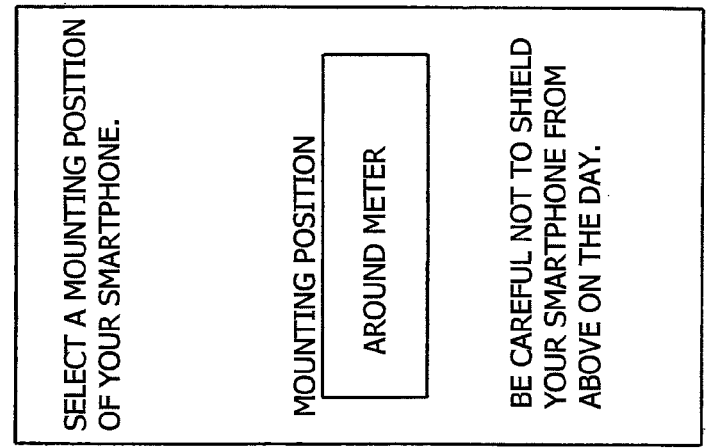

In order to start utilization of the moving body photographing system 1, the user would first start up the moving body photographing application and input a setting of photographing by the moving body photographing system 1 to the moving body photographing application to carry out the reservation of the photographing by the moving body photographing system 1. FIGS. 3(*a*) to 3(*c*) illustrate an example of information to be set when the moving body photographing system 1 of the present embodiment is to be utilized. It is to be noted that FIGS. 3(*a*) to 3(*c*) illustrate an example of a reservation and a setting screen image of the moving body photographing application displayed on the display section 131 of the portable terminal 10. In the example illustrated in FIGS. 3(*a*) to 3(*c*), it is illustrated that a condition when a photograph is to be taken by the moving body photographing system 1 is inputted, namely, set, to the moving body photographing application.

In particular, FIG. 3(*a*) illustrates an example of an input when conditions for a date and a place at which photographing is to be carried out, namely, on a date and a place at which the user is operating a motorcycle, are set. Through the input, photographing by the moving body photographing system 1 is reserved. It is to be noted that also it is possible to carry out such a photographing reservation at a destination on the day to which the user actually operates the motorcycle. In this instance, as the data at which photographing is to be carried out, such selection as "from now on" is carried out. Further, as a place at which photographing is to be carried out, such selection as "nearby photography spot" may be carried out. If this selection is carried out, then the position information of the destination is transmitted to the management apparatus 20, and a list of the nearest places at which photographing is possible is displayed. Further, a photographing reservation can be carried out also such that, photographing is carried out repetitively, for example, for a fixed period of time in the set conditions. Consequently, also it is possible to reserve such that, for example, when the user starts up the moving body photographing application and passes a photographing spot, it always carries out photographing. Also it is possible to make a reservation such that photographing is carried out only when the user passes a photographing spot at which the user has not carried out photographing formerly.

FIG. 3(*b*) illustrates an example of an input when a composition of a photograph, an effect for a photograph to be taken and so forth are set as conditions for a photograph to be taken by the moving body photographing system 1. Based on the conditions, a finish of a photograph to be imaged is determined.

It is to be noted that, while, in the example illustrated in FIG. 3(*b*), it is illustrated that, as the composition, it is set that the curve traveling position is "curve middle stage" and the photographing direction is "side," and as the effect, "normal" is set, various other conditions can be set for the composition and the effect. For example, in the case where the camera apparatus 310 is installed along the curve, the composition can be determined from a curve traveling position of the moving body, a photographing direction and zooming. As the curve traveling position, "approach" wherein the moving body which is a target for photographing approaches a curve, "curve first half" wherein the target is traveling at a position of approximately ¼ of the curve, "curve middle stage" wherein the target is running at a middle position of the curve, "curve latter half" wherein the target is traveling at a position of approximately ¾ of the curve, "escape" wherein the target is going out from the curve, and so forth can be selected.

It is to be noted that such choices for the curve traveling position are determined depending upon what layout the curve has and at what positions of the curve how many camera apparatus 310 are installed. For example, in the case where the camera apparatus 310 is installed along a straight road, the curve traveling position is displayed like "straight traveling position" and is displayed like "straight first half," "straight middle stage" or a "straight latter half."

Further, as the photographing direction, "front" wherein the target is imaged substantially from the front, "oblique front" wherein the target is imaged from an oblique front, "side" wherein the target is imaged substantially from the side, "oblique rear" wherein the target is imaged from an oblique rear, "rear" wherein the target is imaged from the rear and so forth can be selected.

It is to be noted that choices for the photographing direction are determined depending upon what layout the curve has or at what positions of the curve how many camera apparatus 310 are installed. For example, if such camera apparatus 310 are installed on the opposite sides of a road, the "oblique front" described above can be selected more particularly from "oblique left front" or "oblique right front." Further, as regards the zooming, it may be made possible to select "up" wherein the moving body enters in a large size into a frame of the camera apparatus 310, "normal" wherein the moving body enters in a middle size into a frame of the camera apparatus 310, and "wide" wherein the moving body enters in a rather small size into a frame of the camera apparatus 310. Such conditions for the zooming are not shown on the setting screen image of FIG. 3(*b*).

Further, for example, as regards the effect, such various effects can be set as "normal" wherein the shutter speed of the camera apparatus 310 is set to a high speed so that both of the target and the background are photographed clearly, "panning" wherein, while the background is panned, the target is photographed clearly, "low speed shutter" wherein the background is photographed clearly while the target is panned, "zoom during exposure" wherein a zooming operation is carried out within an exposure period before the shutter closes after the shutter opens, and "light trail," which is only for photographing at night, wherein the background is fixed and the shutter is left in an open state to photograph a locus of a lighting unit such as the headlamp of the target. It is to be noted that choices for the effect are determined depending upon the photographing direction of the composition described hereinabove. Further, in the case where a plurality of compositions are set, it is possible to set different effects for the individual compositions, namely, for individual places for photographing.

FIG. 3(*c*) illustrates an example of an input when conditions for a position of the motorcycle at which the portable terminal 10 is to be mounted are set. By such input, a decision with respect to the position of the motorcycle and the determination of a timing for the photographing, namely, a shutter timing, in the moving body photographing system 1 can be carried out accurately.

It is to be noted that, while, in the example shown in FIG. 3(*c*), a case wherein "around meter" is set as the installation position of the portable terminal 10 is illustrated, various other conditions can be set for the installation position of the portable terminal 10. As the installation position of the portable terminal 10, such various installation positions as "rider" wherein the user carries the portable terminal 10, "around meter" wherein the portable terminal 10 is attached around the meter of the motorcycle as described hereinabove, a pocket wherein the portable terminal 10 is accommodated into an accommodation space at a front portion of the motorcycle, "under seat" wherein the portable terminal 10 is accommodated into an accommodation space below the seat of the motorcycle and "vehicle body rear portion" wherein the portable terminal 10 is attached to a rear portion of the motorcycle can be selected.

Consequently, the position of the moving body in a frame of a photograph can be corrected appropriately. For example, if "around meter" is selected as the installation position, then the composition can be set such that the measured position of the portable terminal 10 corresponds to a front portion of the motorcycle. Similarly, if "under seat" is selected, then the composition can be set such that the measured position of the portable terminal 10 corresponds to a substantially central portion of the motorcycle. Further, if "vehicle body rear portion" is selected as the installation position, then the position can be set such that the measured position of the portable terminal 10 corresponds to a rear portion of the motorcycle.

Further, as regards the timing of the shutter signal, if the measured position of the portable terminal 10 corresponds to a substantially central portion of the motorcycle, then the shutter may be depressed when the measured position of the portable terminal 10 comes to an optimum shutter timing position. If the measured position of the portable terminal 10 corresponds to a front portion of the motorcycle, then a shutter signal should be issued at a timing a little later than that of the case where the measured position of the portable terminal 10 corresponds to a substantially central portion of the motorcycle. If the measured position of the portable terminal 10 corresponds to a rear portion of the motorcycle, then a shutter signal should be issued at a timing a little earlier than that of the case where the measured position of the portable terminal 10 corresponds to a substantially central portion of the motorcycle.

Further, since the utilizer of the moving body photographing system 1 is not limited to an operator of a motorcycle, also such installation position as "around dashboard" wherein the portable terminal 10 is disposed around the dashboard of an automobile, "passenger seat" wherein the portable terminal 10 is placed on the passenger seat of the automobile or "glove box" wherein the portable terminal 10 is accommodated in the glove box of the automobile can be set.

It is to be noted that the items of conditions to be set when taking of a photograph is to be carried out by the moving body photographing system 1 are not limited to the examples described above, but any item can be included in a condition for carrying out taking of a photograph only if it can be included in a condition for taking a photograph. Further, it is possible to select the setting contents corresponding to the items of the conditions, in FIGS. 3(*a*) to 3(*c*), the setting contents of the composition, effect and installation position illustrated in FIGS. 3(*a*) to 3(*c*), for example, from a pull-down menu.

After the reservation and setting of imaging in the moving body photographing system 1, namely, inputting or setting to the moving body photographing application, is completed, the moving body photographing application transmits the information of the reserved and set conditions for photographing to the management apparatus 20. If the management apparatus 20 accepts the reserved and set conditions for photographing to the moving body photographing application, then it transmits a response representing that the reservation and setting of the conditions for photographing are accepted to the moving body photographing application. When the moving body photographing application receives the response of the acceptance of the reservation and setting of conditions for photographing from the management apparatus 20, then it causes the display section 131 to display a confirmation screen image. FIGS. 4(*a*) and 4(*b*) are examples in the case wherein the information of the reservation and setting is confirmed in the moving body photographing system 1 according to the embodiment. FIGS. 4(*a*) and 4(*b*) show examples of a confirmation screen image of the moving body photographing application displayed on the display section 131 of the portable terminal 10.

FIG. 4(*a*) shows an example of a confirmation screen image for confirming then reservation and setting of conditions for photographing in the moving body photographing system 1 accepted by the management apparatus 20. After the user confirms the reservation and setting of conditions for photographing displayed on the confirmation screen image, the user would carry out a flicking operation of slidably moving on the screen image in one direction, namely, in a direction toward "Yes" shown in FIG. 4(*a*), in a state in which the screen image is depressed to input that the reservation of photographing by the moving body photographing system 1 is finally determined.

FIG. 4(*b*) shows an example of a confirmation screen image for the notification of a finally determined reservation after the reservation of photographing by the moving body photographing system 1 is finally determined by the user. In the example shown in FIG. 4(*b*), a reservation number is indicated as information for identifying the photographing by the moving body photographing system 1 whose reservation is finally determined.

Thereafter, the moving body photographing application may be ended.

Figure 5A:
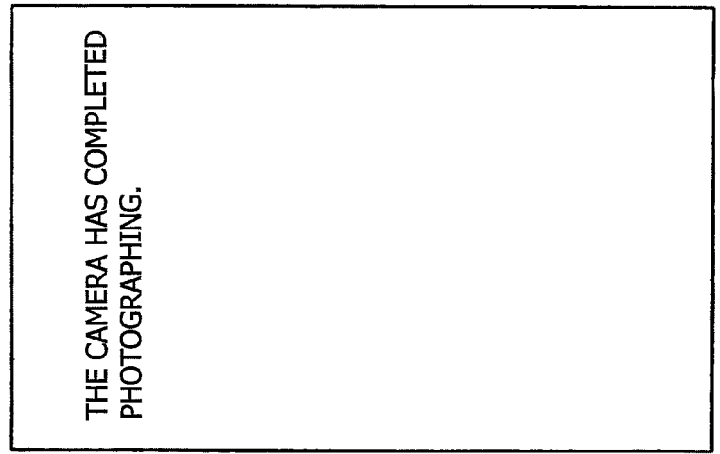
FIGS. 5(a) to 5(c) are views illustrating an example of confirmation when operating the moving body photographing system of the present embodiment is utilized is started and notifications during operation.

Thereafter, the user who utilizes the moving body photographing system 1 would start up the moving body photographing application when the user starts off with the motorcycle. The moving body photographing application confirms whether or not this starting off is the starting of the traveling for photographing by the moving body photographing system 1 whose reservation is finally determined. Then, after the starting of traveling is confirmed, the moving body photographing application notifies the user of a state of control of the photographing apparatus 30 transmitted thereto from the management apparatus 20. FIGS. 5(*a*) to 5(*c*) include views illustrating confirmation when traveling in which the moving body photographing system 1 of the present embodiment is utilized is started and an example of a notification during traveling. It is to be noted that FIGS. 5(*a*) to 5(*c*) show examples of a confirmation screen image and a notification screen image of the moving body photographing application displayed on the display section 131 of the portable terminal 10.

FIG. 5(*a*) shows an example of a confirmation screen image for confirming whether or not the starting off is the starting of the traveling for photographing by the moving body photographing system 1 whose reservation is finally determined. After the user confirms a reservation number and so forth displayed on the confirmation screen image, the user would carry out a flicking operation in a direction toward "Yes" in a state in which the screen image is depressed to input that traveling is started. Consequently, the moving body photographing application starts acquisition of position information at the presence of the motorcycle by the position sensor 120 and transmission in a fixed frequency of the position information at the presence of the motorcycle to the management apparatus 20. Further, the moving body photographing application receives information of a state of control of the photographing apparatus 30 transmitted thereto from the management apparatus 20.

Figure 5B:
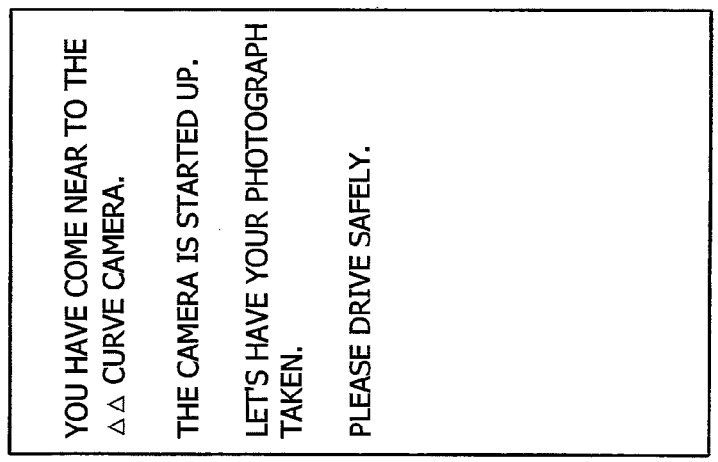

FIG. 5(b) shows an example of a notification screen image for the notification that the camera apparatus 310 comes near to a spot at which the camera apparatus 310 is installed. Since the motorcycle comes near to the photographing apparatus 30, when the moving body photographing application receives information representing that the camera apparatus 310 is started up from the management apparatus 20, it issues a notification representative of the received contents. Consequently, the user can recognize that the taking of a photograph will be carried out soon.

Figure 5C:
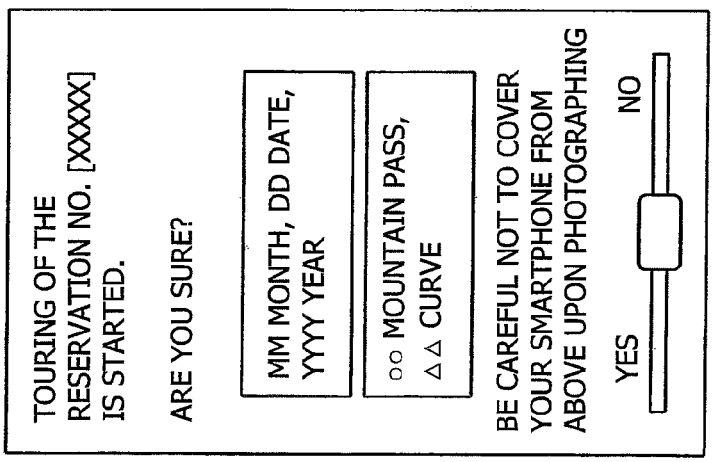

FIG. 5(c) shows an example of a notification screen image for the notification that the taking of a photograph is completed. When the moving body photographing application receives the information representing that taking of a photograph by the camera apparatus 310 is completed from the management apparatus 20, it issues a notification representative of the received contents. Consequently, the user can recognize that the taking of a photograph is ended.

It is to be noted that the contents of the notifications illustrated in FIGS. 5(b) and 5(c) may be included, for example, in a notification by a popup screen image while the portable terminal 10 displays a screen image other than a screen image of the moving body photographing application.

Figure 6C:
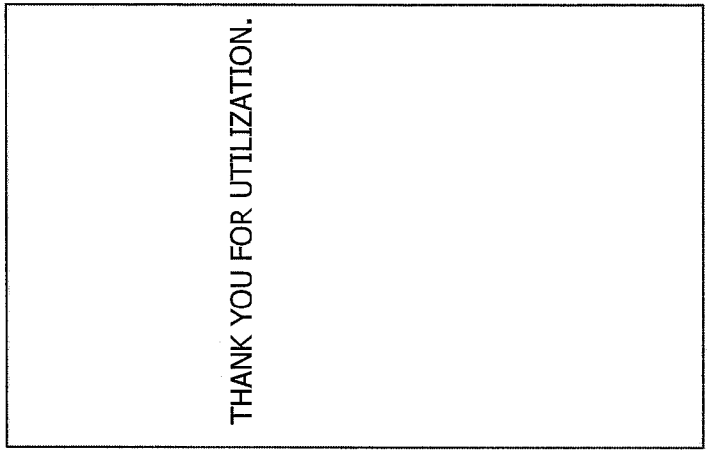
FIGS. 6(a) to 6(c) are views illustrating an example of a case wherein a photograph taken utilizing the moving body photographing system of the present embodiment is confirmed.
Figure 6B:
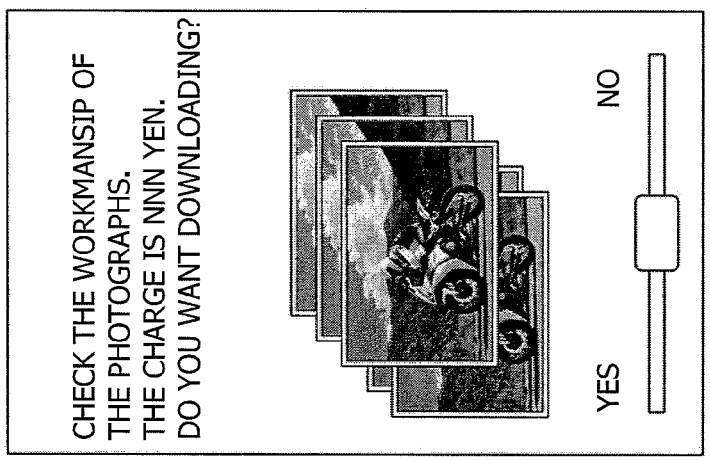
Figure 6A:
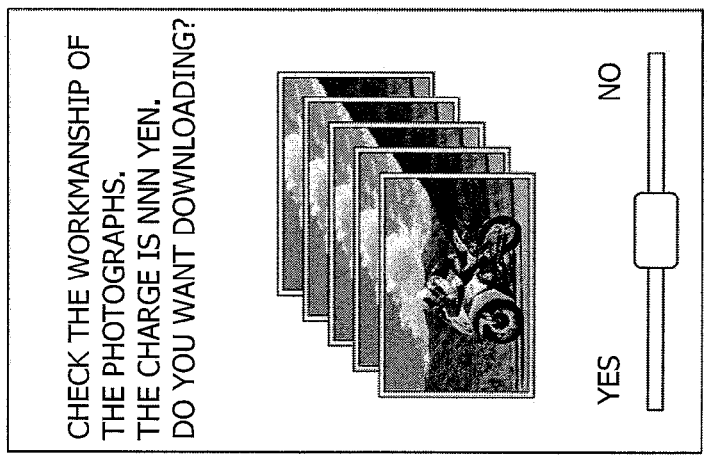

Thereafter, the user who utilizes the moving body photographing system 1 would confirm the photograph taken by the moving body photographing application and actually acquire data of the photograph, namely, image data, to complete the utilization of the moving body photographing system 1. FIGS. 6(a) to 6(c) illustrate an example of the confirmation of the photographs taken utilizing the moving body photographing system 1 of the present embodiment. It is to be noted that FIGS. 6(a) to 6(c) show an example of the conformation screen images of the moving body photographing application displayed on the display section 131 of the portable terminal 10.

It is to be noted that, when a photograph is to be confirmed by the moving body photographing application, the management apparatus 20 does not transmit a large amount of image data photographed by the photographing apparatus 30 to the moving body photographing application but transmits only a small amount of image data, for example, of a thumbnail image or the like. By this, the communication time can be reduced.

FIG. 6(a) shows an example of a confirmation screen image for the confirmation of a photograph sent from the management apparatus 20. The moving body photographing application thus displays a small amount of image data transmitted thereto from the management apparatus 20 on the confirmation screen image. It is to be noted that, if the photographing apparatus 30 takes a plurality of photographs, then in order to urge the user to confirm the photographs, a small amount of data of all the taken photographs is displayed on the confirmation screen image. In the example shown in FIG. 6(a), a small amount of data of a plurality of successively imaged photographs is displayed. In this manner, when the photographing apparatus 30 takes a plurality of photographs successively, the moving body photographing application displays the photographs in an overlapping relationship with each other such that the order of the photographing can be recognized.

FIG. 6(b) shows an example of the confirmation screen image halfway while the user confirms the photographs. When the user confirms the photographs, the user would touch, namely, depress or slidably move on, the confirmation screen image to select a photograph to be confirmed. By this, the moving body photographing application displays the photograph selected by the user on the front most side so that the user can confirm the photograph. In the example shown in FIG. 6(b), it is shown that a central photograph is displayed on the front most side.

Thereafter, the user would carry out a flicking operation in a direction toward "Yes" in a state in which the screen image is depressed and determine a photograph from which a large amount of image data is to be acquired. If a photograph from which a large amount of image data is to be acquired is determined actually by the user, then the moving body photographing application transmits information representative of the determined photograph, which is displayed on the front most side, to the management apparatus 20. Consequently, a large amount of image data of the photograph displayed on the front most side is transmitted from the management apparatus 20.

It is to be noted that also it is possible to determine a plurality of photographs as photographs from which a large amount of image data is to be acquired. In this instance, the moving body photographing application transmits information representative of the determined photographs to the management apparatus 20. Consequently, a large amount of data of the determined photographs is transmitted from the management apparatus 20.

Then, after the transmission of the large amount of image data from the management apparatus 20 is completed, the moving body photographing application displays such a notification screen image as shown in FIG. 6(c) in order to notify the user that the reception of the large amount of image data is completed.

Figure 7:
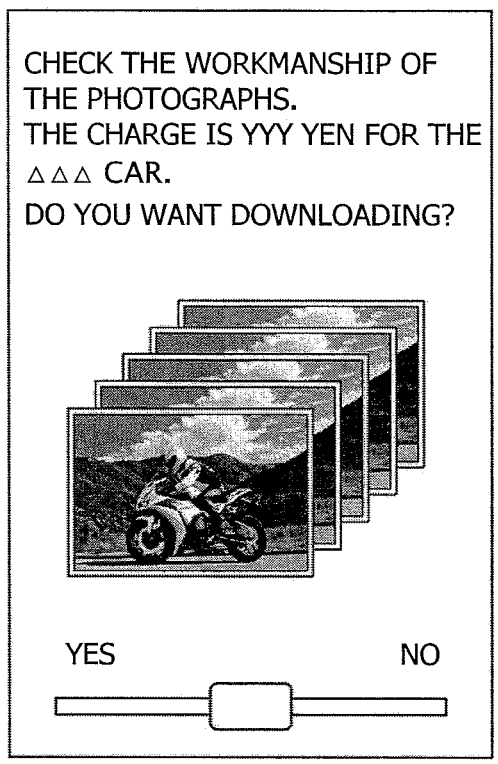
FIG. 7 is a view illustrating a different example of a case wherein a photograph taken utilizing the moving body photographing system of the present embodiment is confirmed.

It is to be noted that, where the moving body photographing system 1 is configured such that, when a reservation and setting of the photographing are inputted to the moving body photographing application, information regarding the user or information of a motorcycle used by the user is set as a user profile, the setting of the fee may differ among different motorcycle makers as seen from FIG. 7.

Figure 8A:
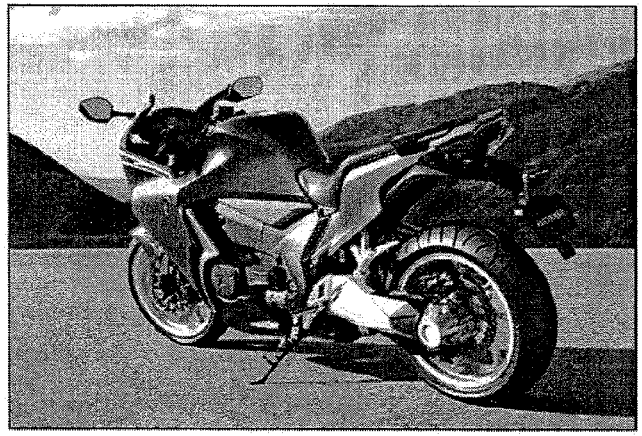
FIGS. 8(a) to 8(c) are views illustrating an example of a photograph taken utilizing the moving body photographing system of the present embodiment.
Figure 8B:
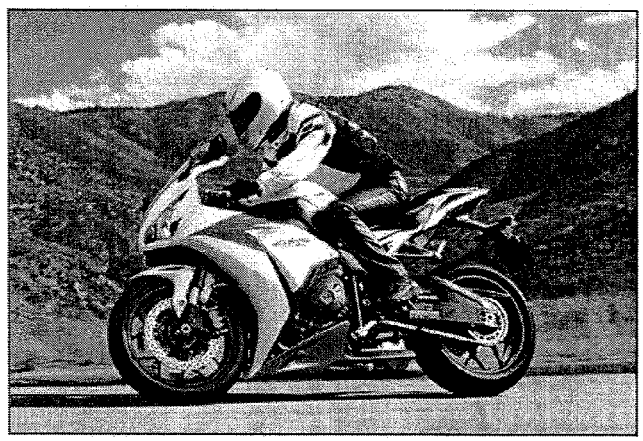
Figure 8C:
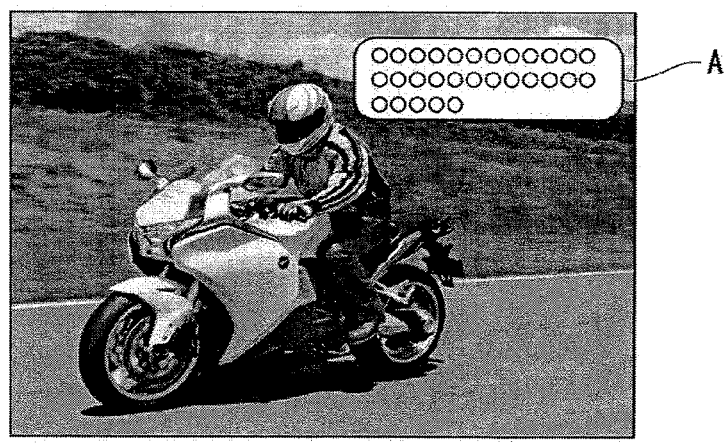

In this manner, if the moving body photographing system 1 is utilized, then a photograph representing a state in which a user himself or herself is operating a motorcycle can be readily taken. FIGS. 8(a) to 8(c) show an example of photographs taken utilizing the moving body photographing system 1 of the present embodiment. In particular, FIG. 8(a) shows an example of a photograph which can conventionally be imaged by a user himself or herself, and FIGS. 8(b) and 8(c) show an example of photographs that can be taken utilizing the moving body photographing system 1.

Conventionally, when a user himself or herself intends to take a photograph of a motorcycle, as shown in FIG. 8(a), the user usually takes a photograph only of the motorcycle. If the moving body photographing system 1 is utilized, then the user can easily take such a photograph representing a state in which the user himself or herself is operating the motorcycle as shown in FIG. 8(b) or 8(c). Further, the user can publish a photograph to which a "comment" is added as in the example shown in FIG. 8(c) so that the photograph can be approached, for example, on a Web page for exclusive use for an individual on the Internet.

Figure 9:
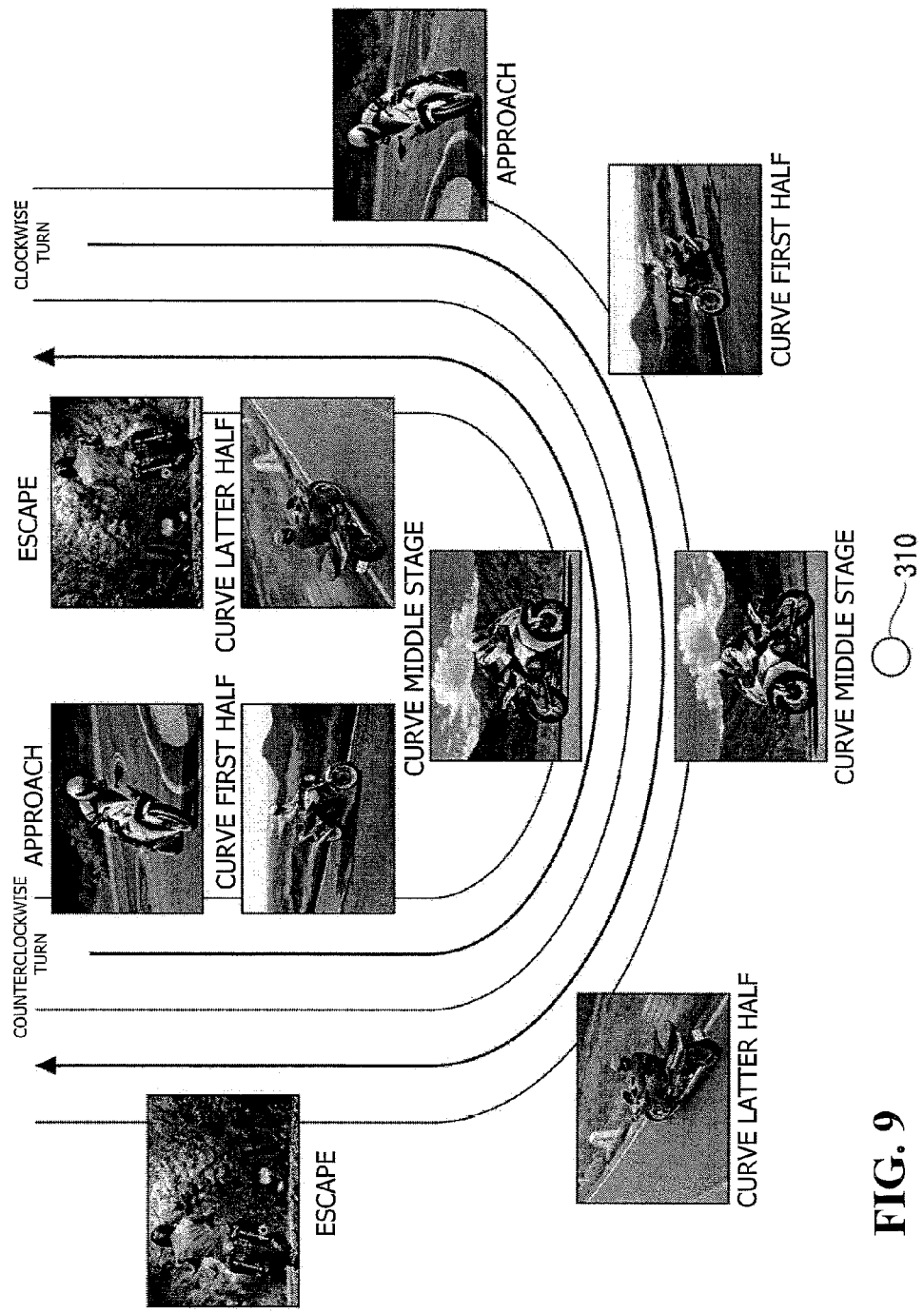
FIG. 9 is a view showing an example of a composition of a photograph to be taken utilizing the moving body photographing system of the present embodiment.

A composition and an effect when a photograph is taken by the moving body photographing system 1 are described. FIG. 9 illustrates examples of a composition of a photograph taken utilizing the moving body photographing system 1 of the present embodiment. FIGS. 10(a) to 10(d) illustrate examples of effects of the photographs taken utilizing the moving body photographing system 1 of the present embodiment.

As described hereinabove, with the moving body photographing system 1, a composition of a photograph to be taken can be set (refer to FIG. 3(b)). As a composition of a photograph to be taken by the moving body photographing system 1, such compositions as, for example, "approach," "curve first half," "normal," "curve latter half," "escape" and so forth are available. In FIG. 9, examples of a photograph of a motorcycle taken by the moving body photographing system 1 when such compositions of the example described above are set are shown. It is to be noted that, in the example illustrated in FIG. 9, the camera apparatus 310 is installed at a position indicated by a round mark in FIG. 9. The camera apparatus 310 takes photographs of the compositions in response to a "clockwise turn" and a "counterclockwise turn."

As described hereinabove, the moving body photographing system 1 can set an effect for a photograph to be taken (refer to FIG. 3(b)). As an effect for a photograph to be taken by the moving body photographing system 1, for example, "panning," "low speed shutter," "zoom during exposure," "light trail" and so forth are available as described hereinabove. FIGS. 10(a0 to 10(d) show examples of photographs of a motorcycle taken by the moving body photographing system 1 when such effects of the example as described hereinabove are set. The camera apparatus 310 takes photographs wherein the set effects are reflected individually.

As described above, according to the embodiment of the present invention, the taking of a photograph by the moving body photographing system 1 is reserved. Then, the moving body photographing system 1 decides a position at which a motorcycle is traveling and takes a photograph when the motorcycle passes the place at which the camera apparatus 310 is installed. Consequently, the user of the moving body photographing system 1 can easily take a photograph representing a state in which the use himself or herself is operating the motorcycle.

Further, according to the embodiment of the present invention, a composition or an effect when a photograph is to be taken is set in advance. Consequently, a photograph conforming to the liking of the user of the moving body photographing system can be imaged.

It is to be noted that, in the present embodiment described above, the moving body photographing system 1 carries out position measurements using wireless communication as a method for deciding a position at which a motorcycle is traveling. However, the method of deciding a position at which a motorcycle is traveling is not limited to the embodiment of the present invention. For example, also it is possible to decide a position of a motorcycle from position information as to the presence of the motorcycle transmitted from the portable terminal 10, namely, position information acquired by the GPS system described hereinabove. In this instance, it is desirable to provide a configuration for receiving position information based on the presence of a motorcycle transmitted from the portable terminal 10 also on the photographing apparatus 30. Also it is possible to adopt a configuration wherein the position of a motorcycle is directly decided, for example, using a loop coil or the like.

Figure 11:
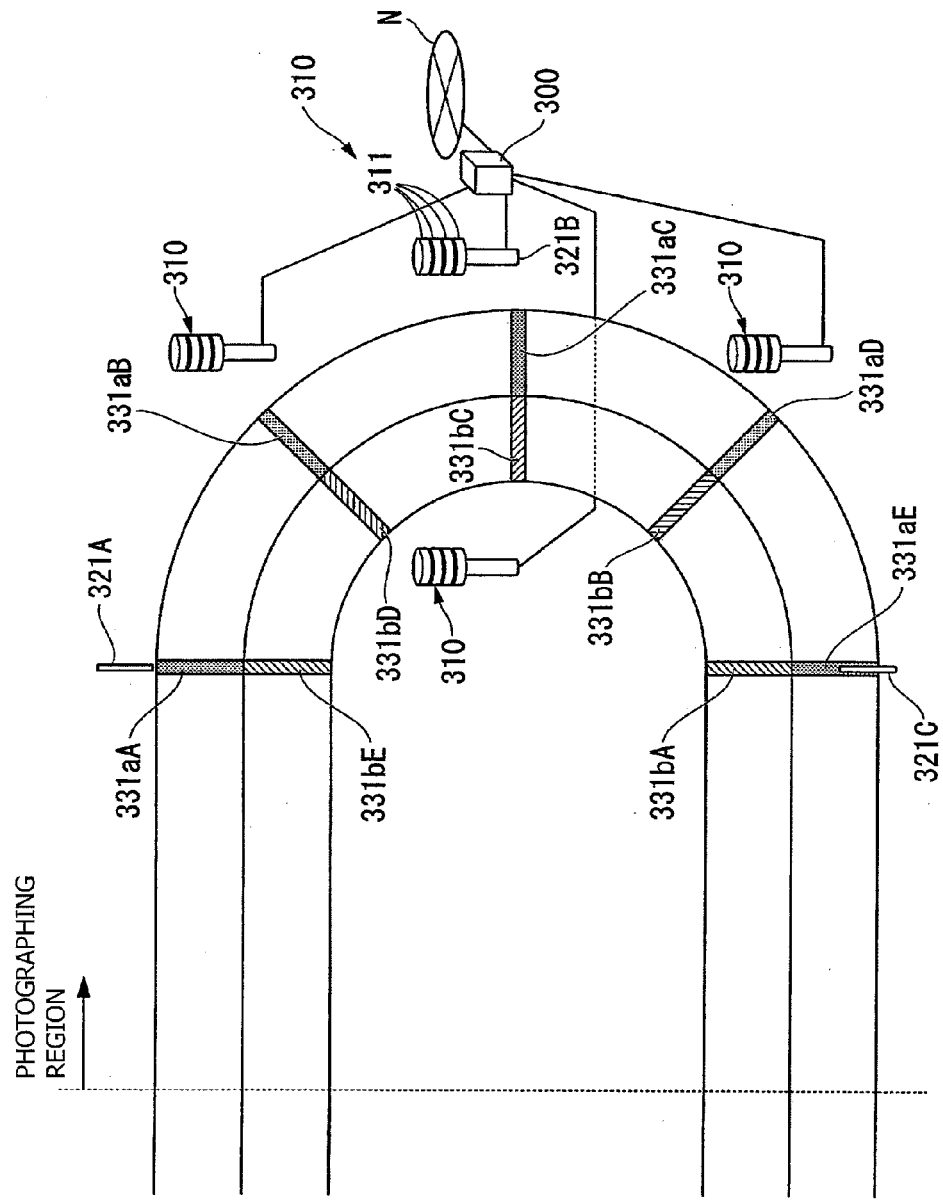
FIG. 11 is a view showing an example of a configuration for deciding a position of a vehicle in the moving body photographing system of the present embodiment.

Here, an example wherein the position of a motorcycle is decided using a loop coil is described. FIG. 11 is a view showing an example of a configuration for deciding the position of a vehicle in the moving body photographing system 1 of the present embodiment. In the example shown in FIG. 11, loop coils 331 (331aA, 331aB, 331aC, 331aD, 331aE, 331bA, 331bB, 331bC, 331bD and 331bE) are installed for each lane at spots at each of which a wireless LAN access point 321 is installed and intermediate spots between the wireless LAN access points 321.

In the configuration shown in FIG. 11, at the spots at which the loop coil 331 is installed, the camera apparatus 310 carries out an actual taking of a photograph. It is to be noted that the reason why the loop coil 331 is installed for each lane is that the direction corresponding to the reserved and set composition differs depending upon the advancing direction of the motorcycle. The photographing controlling section 300 outputs a shutter signal to the camera apparatus 310 when it receives, from each loop coil 331, a signal inputted thereto and representing that the motorcycle is at a spot at which the loop coil 331 is installed. Consequently, a photograph of the motorcycle at the spot at which the loop coil 331 is installed is taken.

It is to be noted that the moving body photographing system 1 may be configured such that the position measuring method for a motorcycle which uses wireless communication according to the present embodiment, the position measurement method for a motorcycle which is based on position information from a GPS apparatus described hereinabove, and the position measurement method for a motorcycle which uses a loop coil described above are individually used solely. However, the moving body photographing system 1 may otherwise be configured such that the position measurement methods mentioned are used in combination or all of the position measurement methods are used.

It is to be noted that, in the present embodiment, also while the user is operating the motorcycle, the moving body photographing application continues to transmit position information with respect to the presence of the motorcycle acquired by the position sensor 120 to the management apparatus 20. However, since the portable terminal 10 is driven by a battery provided on the portable terminal 10 itself unless power is supplied from the outside, depending upon the remaining capacity of the battery, the battery may possibly be used up during operation. Therefore, it is desirable to attach the portable terminal 10 to the motorcycle so that the portable terminal 10 can be charged simultaneously.

Further, where the portable terminal 10 is attached, depending upon the initial setting, the brightness of the screen display of the portable terminal 10 cannot assure sufficient outdoor observability in the daytime. On the contrary, the brightness of the screen display may be excessively bright at night. Further, with a touch panel of the capacitive type, the gloves which the rider wears may not be ready for an operation of the touch panel and the touch panel may not be able to be operated unless the rider removes the gloves in order to operate the portable terminal 10. From such situations as described above, where the portable terminal 10 is to be attached to a motorcycle, it is desirable to take charging of the portable terminal 10, observability of the display screen image and the operability of the touch panel into consideration.

Modification to the Attachment of the Portable Terminal 10 to a Motorcycle.

Figure 12:
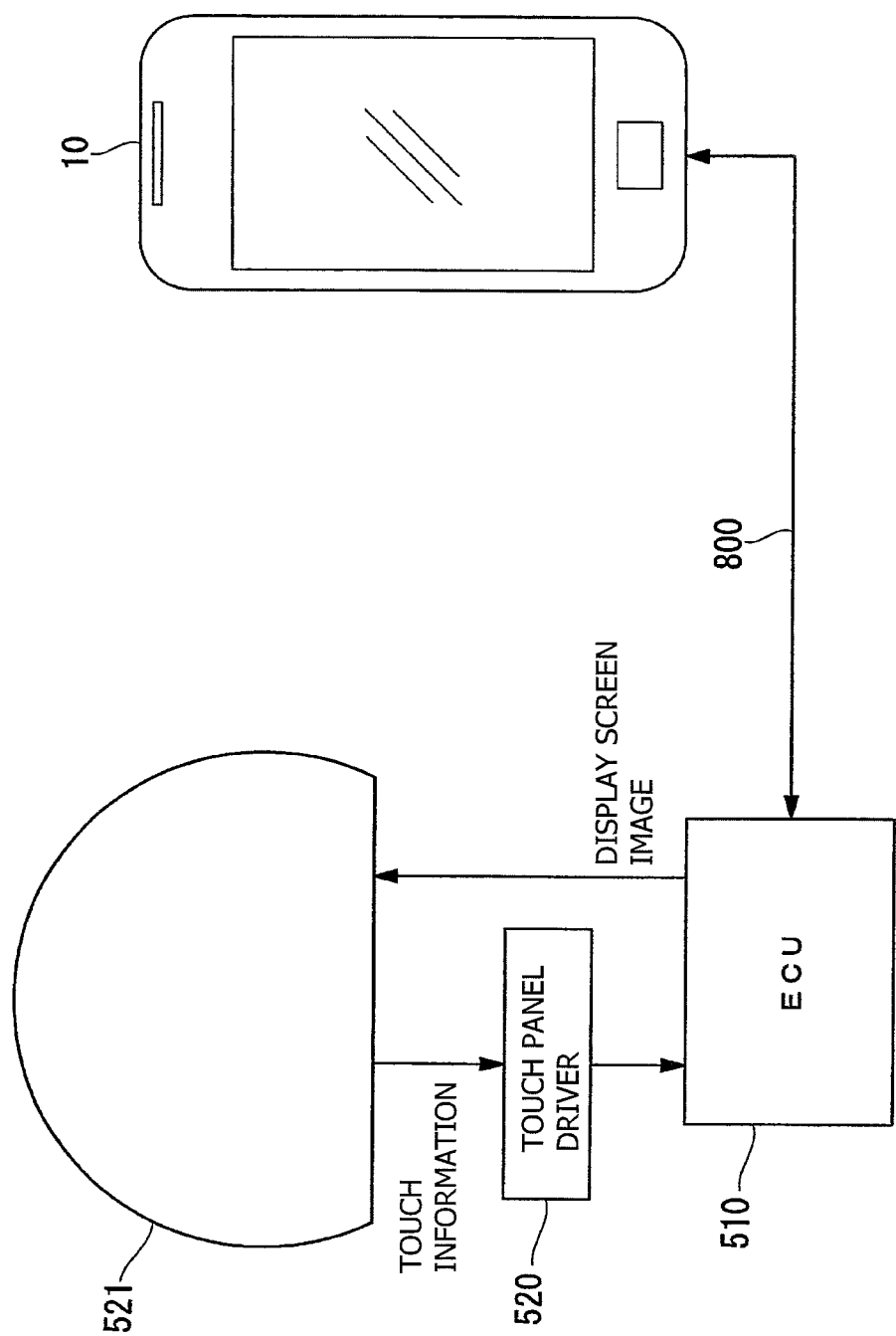
FIG. 12 is a view illustrating an example of a connection scheme when the moving body photographing system of the present embodiment is utilized with a portable terminal attached to a saddle type vehicle.
Figure 13:
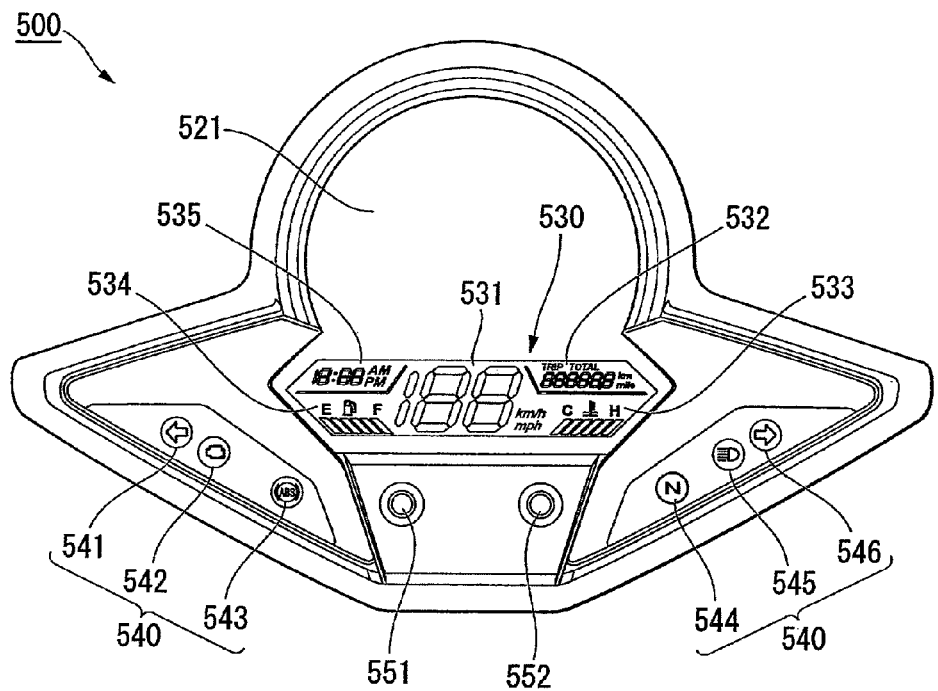
FIG. 13 is an enlarged view of a meter section of the saddle type vehicle.
Figure 14:
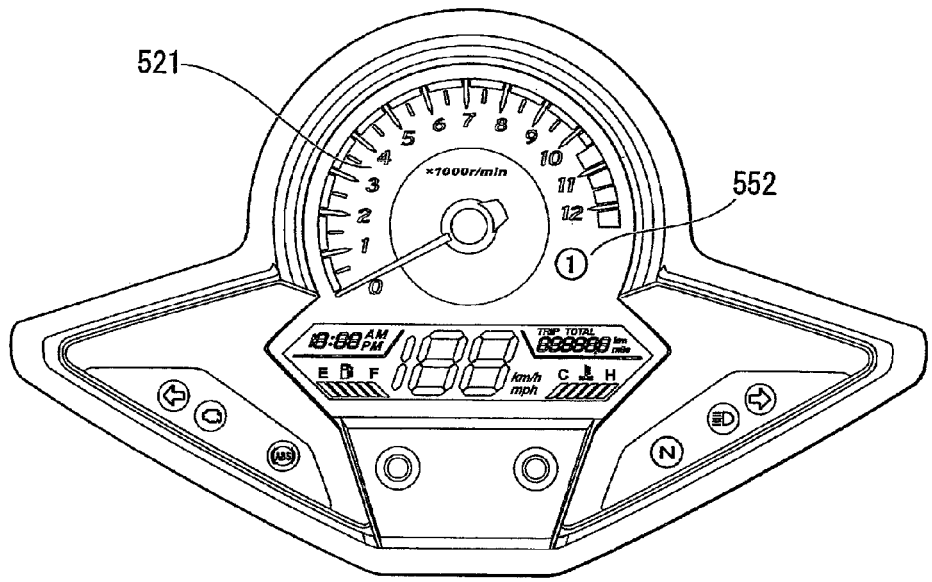
FIG. 14 is another enlarged view of the meter section of the saddle type vehicle.

In the following, a modification wherein the portable terminal 10 is attached to a motorcycle to utilize the moving body photographing system 1 is described. FIG. 12 is a view showing an example of a connection scheme when the portable terminal 10 is attached to a saddle type vehicle to utilize the moving body photographing system 1 of the present embodiment. Meanwhile, FIGS. 13 and 14 are enlarged views of a meter section of the saddle type vehicle.

The motorcycle includes an ECU 510, a meter 500, a touch panel 521 provided in the meter 500, and a touch panel driver 520. The meter 500 includes a main meter section 530 and an indicator 540 as shown in FIG. 13. The meter 500 shown in FIG. 13 includes, in the main meter section 530, the touch panel 521, a speedometer 531, a distance meter 532, a water temperature gauge 533, a fuel gauge 534, and a clock 535. Further, the meter 500 includes, in the indicator 540, a left winker indicator 541, an engine indicator 542, an ABS indicator 543, a neutral indicator 544, a high beam indicator 545, and a right winker indicator 546. Further, the meter 500 includes also buttons 551 and 552, for example, for initializing the distance meter 532 and setting the time to the clock 535.

The touch panel 521 has functions similar to those of a touch panel of the portable terminal 10 configured from a combination of the display section and the operation inputting section. In the following description, it is assumed that the touch panel 521 is disposed at a position of a tachometer in the main meter section 530 of the motorcycle (refer to FIG. 13). It is to be noted that the touch panel 521 is that of the waterproof type and an existing touch panel of the pressure sensor type or the special capacitive type.

The ECU 510 carries out electric control of the motorcycle. Further, the ECU 510 outputs information of the components of the motorcycle. For example, the ECU 510 outputs information of the speed of rotation of the engine of the motorcycle and the gear position (for example, first to sixth speed position or neutral position) in response to an operation of a throttle (accelerator) not shown by the user as a display screen image to the touch panel 521. Consequently, the information of the speed of rotation of the engine and the gear position in an ordinary state in which the motorcycle is traveling is displayed on the display section of the touch panel 521 (refer to FIG. 14). It is to be noted that the gear position is displayed in a gear position displaying region 522 in the display region of the touch panel 521.

The touch panel 521 acquires information of a position touched by the user through the operation inputting section of the touch panel 521. The touch panel 521 inputs the acquired information of the touched position as touch information to the touch panel driver 520. The touch panel driver 520 transfers the touch information inputted thereto from the touch panel 521 to the ECU 510.

The portable terminal 10 is connected to the ECU 510 by a cable 800 as illustrated in FIG. 12. The portable terminal 10 operates with electric power supplied thereto through the cable 800. At this time, also charging of the portable terminal 10 is carried out by the electric power supplied through the cable 800. Consequently, such battery expiration of the portable terminal 10 as described hereinabove can be prevented.

Further, in the present modification, the ECU 510 and the portable terminal 10 carry out communication of data therebetween through the cable 800. For example, the ECU 510 outputs touch information inputted thereto through the touch panel driver 520 to the portable terminal 10 through the cable 800.

Further, for example, the portable terminal 10 outputs a display screen image by the moving body photographing application to the ECU 510 through the cable 800. Consequently, a display screen image for setting a condition for photographing to be reserved and set to the moving body photographing system 1 or a confirmation screen image or a notification screen image of the moving body photographing application, which has been displayed on the display section of the portable terminal 10, can be displayed on the touch panel 521 provided on the motorcycle (refer to FIGS. 3 to 6). Then, the user can utilize the moving body photographing system 1 by operating not the portable terminal 10 but the touch panel 521 provided on the motorcycle. Consequently, the problem regarding assurance of the observability of screen display and the operability of the touch panel in a state in which the gloves are worn can be eliminated.

It is to be noted that, when the motorcycle and the portable terminal 10 are not connected to each other, such information of a speed of rotation of the engine in an ordinary state of the motorcycle as illustrated in FIG. 14 is displayed on the touch panel 521. Further, the screen display on the touch panel 521 may be changed over to a screen image of a tachometer, a fuel gauge, distance to empty, a watch, a lap time meter or the like, for example, by depressing the button 551.

In addition, when the rider travels with a motorcycle toward the place at which the camera apparatus 310 is installed, the weather is not always agreeable. In other words, the rider may be operating the motorcycle in the rain. Since the touch panel provided on the portable terminal 10 in most cases is of the capacitive type, if rainwater hits on the touch panel of the portable terminal 10, then there is the possibility that an operation of the camera apparatus may be recognized in error. However, in the present modification, the motorcycle and the portable terminal 10 are connected to each other by the cable 800 as described hereinabove. Therefore, where the portable terminal 10 is attached to the motorcycle, it should be attached to an existing accommodation section such as an accommodation pocket around the handlebar or an accommodation space under the seat with waterproofing and dustproofing of the main body of the portable terminal 10 taken into consideration. In order to connect the portable terminal 10 and the motorcycle to each other, it is only necessary to use connectors of the cable 800 or the like.

Figure 15:
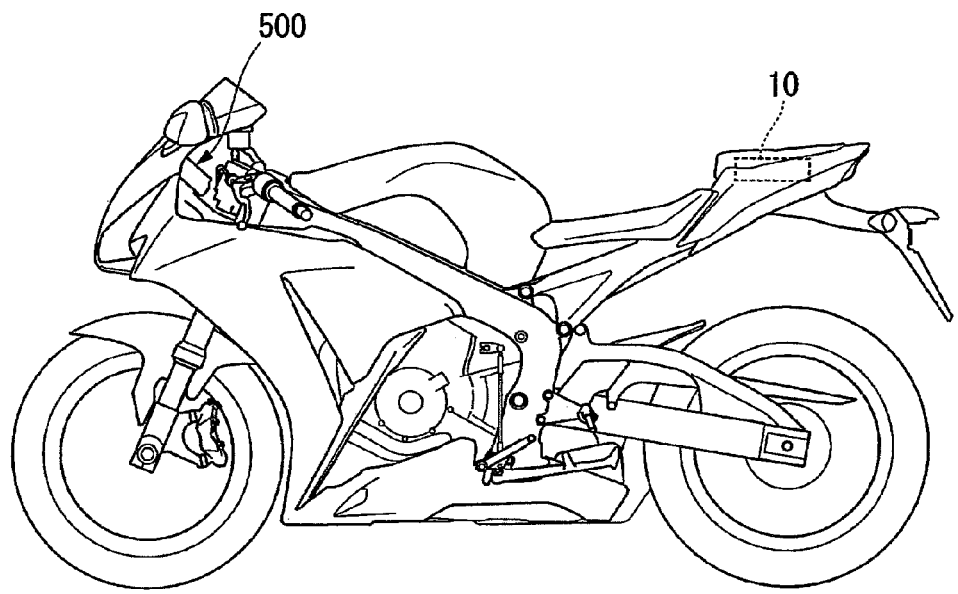
FIG. 15 is a view illustrating an example of disposition of a portable terminal when the portable terminal is attached to the saddle type vehicle.

The attachment position when the portable terminal 10 is attached to the motorcycle is hereinafter described. FIG. 15 is a view showing an example of the disposition of the portable terminal 10 when the portable terminal 10 is attached to the saddle type vehicle. As shown in FIG. 15, the portable terminal 10 is accommodated in an accommodation space under the seat of the motorcycle and is connected to the ECU 510 through the connectors of the cable 800 disposed in the accommodation space. By attaching the portable terminal 10 to a position at which it is less liable to get wet or be covered with dust in this manner, the waterproof state and the dustproof state of the main body of the portable terminal 10 and the cable 800 (including the connectors) can be assured readily making use of the existing accommodation space.

In the present modification, the condition of the position at which the portable terminal 10 is mounted on the motorcycle is set to "under seat." Consequently, also the accuracy of the decision of the position of the motorcycle in the moving body photographing system 1 and the determination of the timing (shutter timing) for photographing is assured.

Utilization Method of the Portable Terminal 10 in a State in Which the Portable Terminal 10 Is Attached to the Motorcycle.

Now, several examples of the utilization of the portable terminal 10 in a state wherein the portable terminal 10 is attached to the motorcycle are described. FIGS. 16 to 20 are views showing examples of a display screen image of the touch panel 521 when the portable terminal 10 is attached to the saddle type vehicle.

Figure 16:
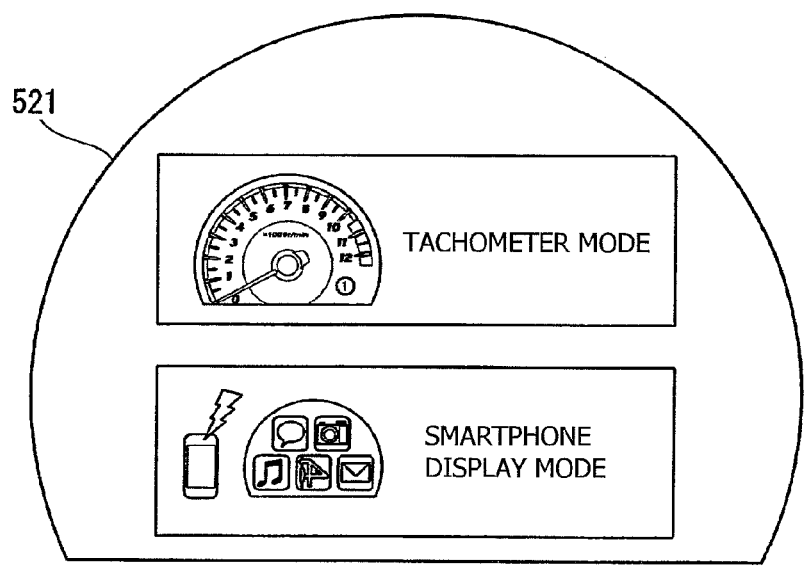
FIG. 16 is a view showing an example of a display screen image when the portable terminal is attached to the saddle type vehicle.

If the portable terminal 10 is connected to the motorcycle, then the ECU 510 causes a display screen image for allowing selection of display of the touch panel 521 to be displayed. Further, at this time, the portable terminal 10 outputs the display screen image to be displayed on the touch panel 521 to the ECU 510 and places itself into a state wherein it accepts the information (touch information) with respect to an operation of the touch panel 521 inputted thereto from the ECU 510 and operates in response to the accepted information. FIG. 16 shows an example of a display screen image for selecting a "tachometer mode" in which ordinary information of the speed of rotation of the engine is to be displayed and a "smartphone display mode" in which a display screen image of the portable terminal 10 is to be displayed, namely, the touch panel 521 operates as a touch panel provided on the portable terminal 10. The user would touch (depress) one of the modes displayed on the touch panel 521. Consequently, the ECU 510 changes over the display to display of the selected mode. It is to be noted that the display changeover of the mode may be carried out by the button 551 or the button 552.

Figure 17:
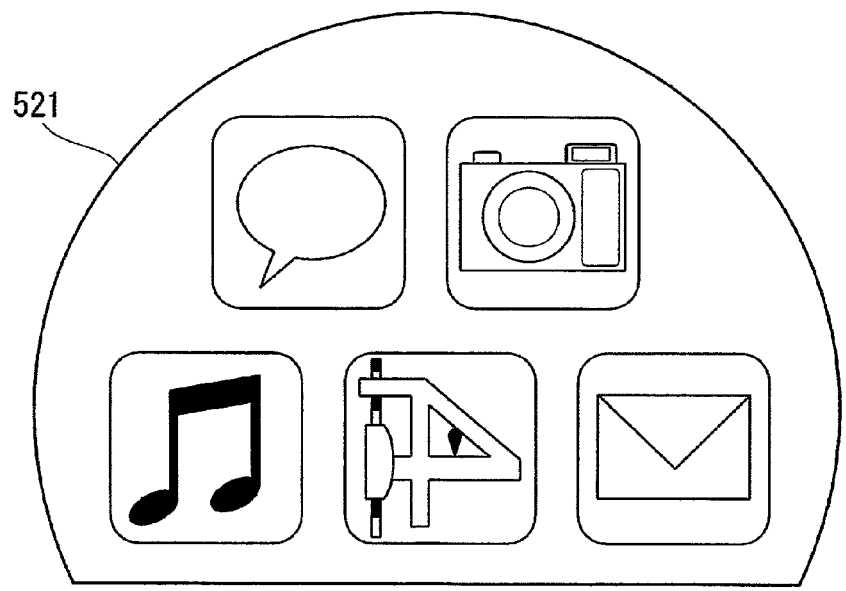
FIG. 17 is a view showing another example of a display screen image when the portable terminal is attached to the saddle type vehicle.

If the user selects the "tachometer mode," then the ECU 510 controls the touch panel 521 to display such a display screen image of information of the speed of rotation of the engine as shown in FIG. 14. On the other hand, if the user selects the "smartphone display mode," then the ECU 510 controls the touch panel 521 to display a display screen image of the portable terminal 10. FIG. 17 shows an example of a display screen image of icons for starting up various application functions of the portable terminal 10. At this time, an OS or an application of the portable terminal 10 outputs a display screen image conforming to the touch panel 521 provided on the motorcycle such as to adjust the layout of a GUI (Graphical User Interface) to be displayed to the touch panel 521 through the ECU 510.

Figure 18:
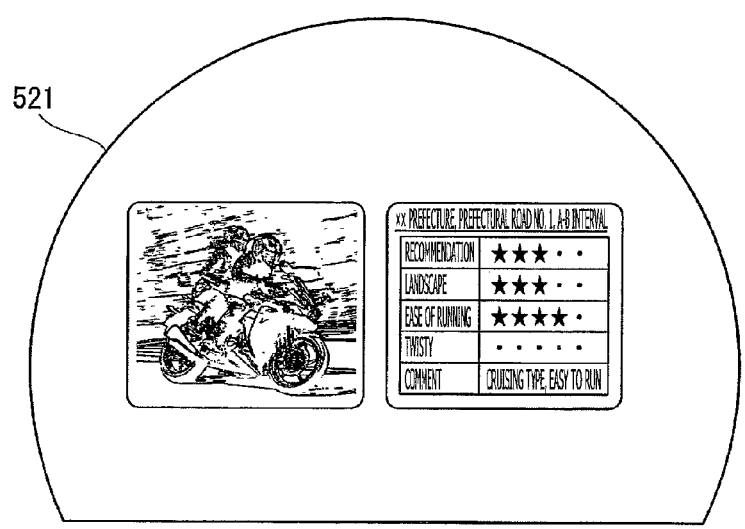
FIG. 18 is a view showing a further example of a display screen image when the portable terminal is attached to the saddle type vehicle.

It is to be noted that the display screen image to be outputted to the ECU 510 need not include all icons for starting up the applications which the portable terminal 10 has, but may give, for example, priority to applications to be used by the motorcycle so that a display screen image including those icons for starting up the applications is displayed as shown in FIG. 18. FIG. 18 shows an example of a display screen image that includes an example of an icon for starting up the moving body photographing application. In the alternative, the portable terminal 10 may be configured so as not to display a display screen image such as an incoming call screen image of the portable telephone.

Figure 19:
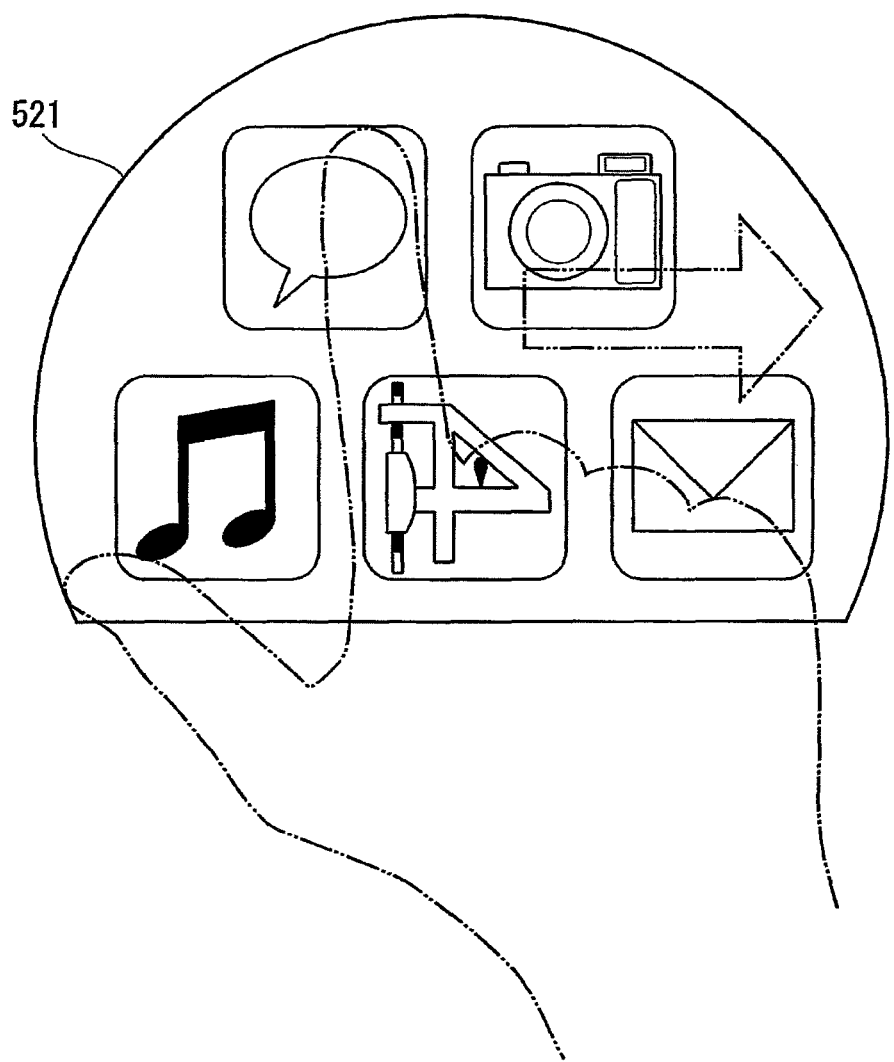
FIG. 19 is a view showing a still further example of a display screen image when the portable terminal is attached to the saddle type vehicle.
Figure 20:
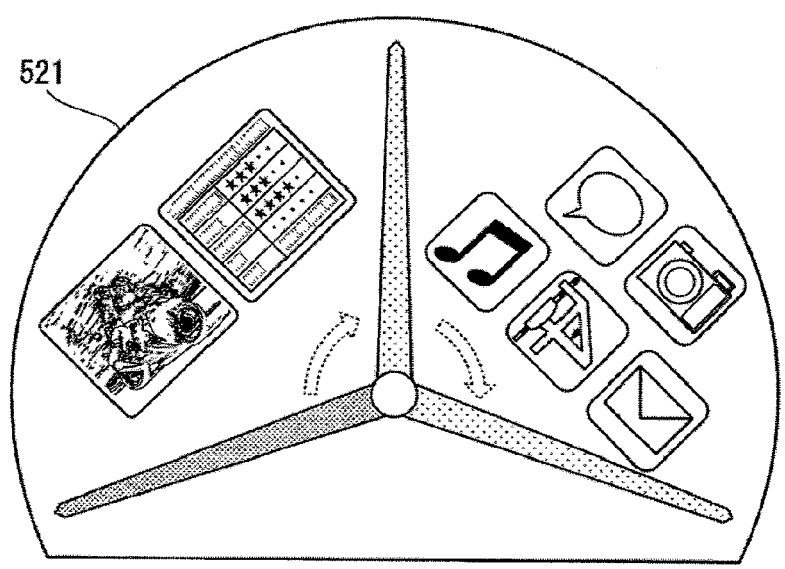
FIG. 20 is a view showing a yet further example of a display screen image when the portable terminal is attached to the saddle type vehicle.

When a display screen image of the portable terminal 10 is displayed on the touch panel 521, if the user carries out an operation of sliding on the display screen image of the touch panel 521 or a flicking operation as illustrated in FIG. 19, then, for example, the display screen image may be changed over to a next display screen image while a pointer of a tachometer exhibits such an action so as to turn from a minimum value to a maximum value as illustrated in FIG. 20.

Figure 21:
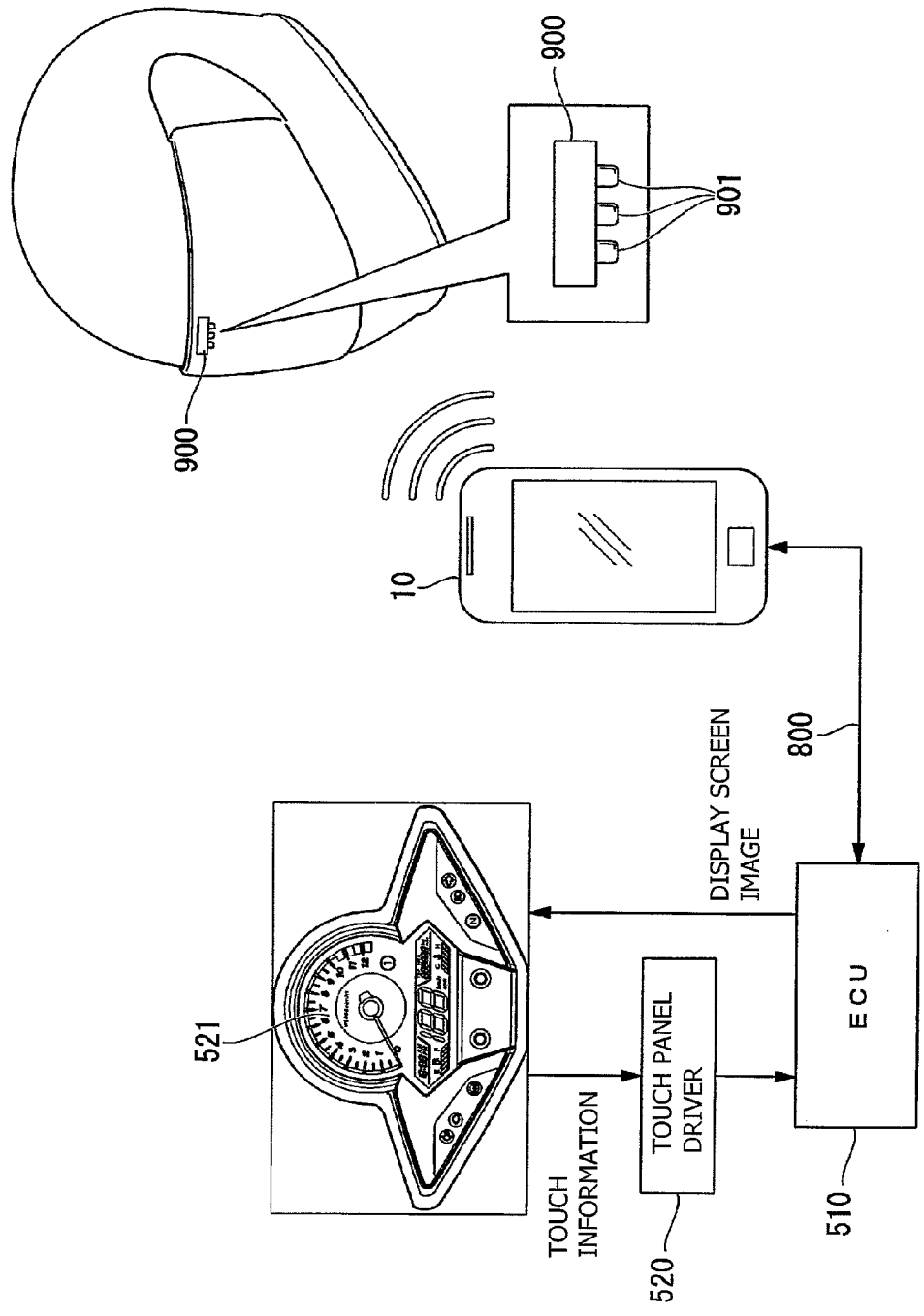
FIG. 21 is a view showing an example of a configuration for urging a rider to confirm a display screen image of the saddle type vehicle.

It is to be noted that, in order to cause a user to recognize that, when the user is operating the motorcycle, a notification screen image, for example, shown in FIG. 5(*b*) for notifying the user that the motorcycle is approaching the spot at which the camera apparatus 310 is installed is displayed, it is preferable to provide a configuration for informing the user of a change of the display screen image or the like when this is necessary. However, in the case of a motorcycle, it is sometimes difficult to use voice to notify the user to confirm the display screen image because of the sound of the motorcycle itself such as the engine sound, sound of surrounding vehicles, sound of the wind upon operation of the motorcycle and so forth. FIG. 21 is a view showing an example of a configuration for urging the user to confirm the display screen image of the motorcycle. FIG. 21 shows an example of a configuration wherein a small helmet side indicator 900 is disposed at a position on the upper side of a front face opening of a helmet to be mounted on the rider at which the rider can recognize the helmet side indicator 900 without blocking the view such that the helmet side indicator 900 is turned on to urge the rider to confirm the display screen image of the touch panel 521 of the motorcycle.

The helmet side indicator 900 includes, for example, a plurality of light emitting diodes (LEDs) 901 such that a type of information for urging the rider to confirm is let known depending upon the LEDs 901 that is turned on. Driving of the LEDs 901 is carried out by short-range wireless communication such as, for example, the Bluetooth (registered trademark) from the portable terminal 10. The portable terminal 10 transmits a notification signal to the helmet side indicator 900, for example, when a notification that the motorcycle approaches the spot at which the camera apparatus 310 is installed is issued as illustrated in FIG. 5(*b*) or when the taking of a photograph is completed as illustrated in FIG. 5(*c*). By turning on the LED 901 of the helmet side indicator 900 to issue a notification to urge the rider to confirm the display screen image in this manner, even in a state wherein the sound of the motorcycle itself such as the engine sound, sound of surrounding vehicles, sound of the wind upon operation or the like exists, it is possible to cause the rider to recognize a change of the display screen image or the like readily and with certainty.

Figure 22:
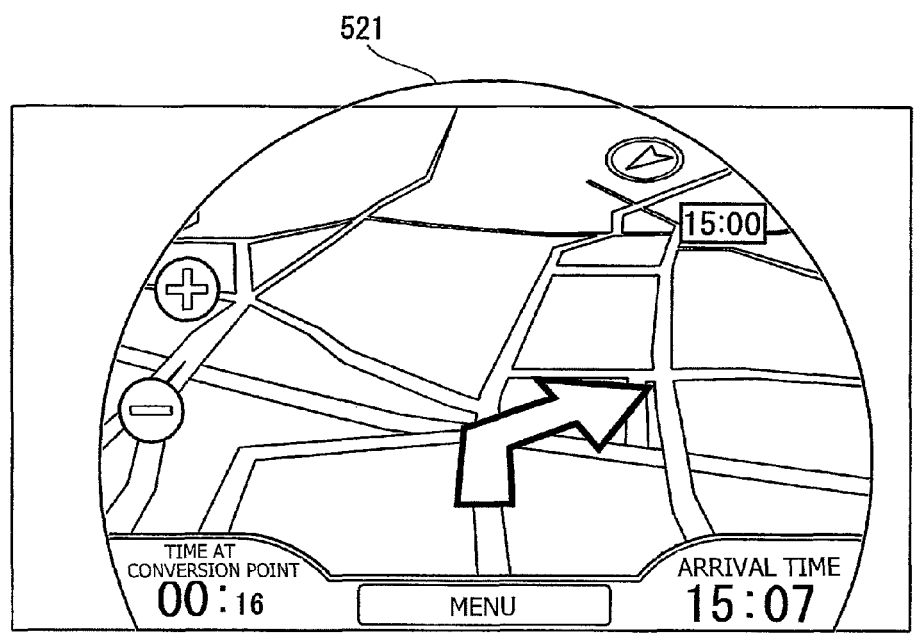
FIG. 22 is a view showing an example of a display screen image when the portable terminal is attached to the saddle type vehicle.

In addition, it is possible to allow the touch panel 521 to display a display screen image of the portable terminal 10, namely, to use the various application functions of the portable terminal 10. When the rider starts up a navigation function which the portable terminal 10 has, it is possible for the touch panel 521 to display a screen image for a route guide. It is to be noted that, when a necessary GUI is included in the touch panel 521, part of the screen image for a route guide may be displayed on the touch panel 521 as shown in FIG. 22. By causing the screen image for a route guide to be displayed on the touch panel 521, the navigation function that the portable terminal 10 has can be utilized, and the navigation function can be introduced into the motorcycle in a state wherein the cost is suppressed to be comparatively low.

Further, also by the navigation function, the helmet side indicator 900 can be utilized for notification for urging the rider to confirm the screen image for a route guide. For example, when a notification of a spot for turning to the right or the left at a crossing is included in the route guide, the portable terminal 10 transmits a notification signal to the helmet side indicator 900 to turn on the LED 901 of the helmet side indicator 900. Consequently, even in a state wherein the sound of the motorcycle itself such as the engine sound, the sound of surrounding vehicles, the sound of wind upon operating the motorcycle or the like exists, it is possible to cause the rider to readily and with certainty confirm the screen image for a route guide. It is to be noted that, if the LEDs 901 of the helmet side indicator 900 are formed so as to indicate different colors such as, for example, orange, green and red such that the LED 901 for orange is blinked upon turning to the right or the left, then the rider can readily grasp the teaching contents.

In this manner, by attaching the portable terminal 10 to the motorcycle, various functions utilizing not only the mobile photographing system of the present invention but also a portable terminal and a motorcycle can be implemented.

It is to be noted that, in the description of the present embodiment, a case is described wherein the moving body photographing system is applied to a saddle type vehicle (motorcycle). However, the moving body to which the moving body photographing system of the present invention can be applied is not limited to the motorcycle described hereinabove in connection with the present embodiment. For example, the saddle type vehicle includes general vehicles on which a driver rides across the vehicle body, and not only to motorcycles but also to three-wheeled (including also a vehicle having two front wheels and one rear wheel in addition to a vehicle having one front wheel and two rear wheels) or four-wheeled vehicles, the moving body photographing system of the embodiment of the present invention can be applied. Furthermore, the moving body photographing system can be applied also to automobiles, bicycles and so forth. Further, the moving body photographing system can be utilized also for the taking of a photograph not only of a vehicle of a photograph but in a walking state.

Furthermore, the moving body photographing system of the present invention can be applied also to various sports such as skiing. In the case of sports such as skiing, since the range within which a target of a photographing object moves is limited to the inside of a ski area (range within which sports are done) or the like, the moving body photographing system can handle the position of a user assuming that that it is within the range within which the sports are done. In particular, in the case where the moving body photographing system of the present invention is applied to various sports, the approach decision of a moving body by the moving body approach decision section 220 can possibly be omitted. Where the approach decision of a moving body can be omitted, if such setting as a composition of photographing is carried out in advance, then the portable terminal 10 which is to be carried by the user when the user carries out sports may be an apparatus smaller than a smartphone that can carry out wireless LAN communication. Thus, it is easy to carry out and achieve in sports the photographing of a moving body.

Further, while, in the present embodiment, a case is described wherein the moving body photographing system 1 is applied to a motorcycle that travels by the driving of an engine, the vehicle to which the moving body photographing system of the embodiment of the present invention can be applied is not limited to a vehicle having a configuration similar to that of the motorcycle described hereinabove in connection with the present embodiment. For example, the moving body photographing system of the embodiment of the present invention can be applied not only to a motorcycle or a three-wheeled (including also a vehicle having two front wheels and one rear wheel in addition to a vehicle having one front wheel and two rear wheels) but also to a four-wheeled vehicle that travels by the driving of an electric motor.

It is to be noted that a program for implementing the processes by the management apparatus 20 which is a component of the moving body photographing system 1 of the present embodiment and the photographing controlling section 300 and the wireless position measurement section 320 provided in the photographing apparatus 30 may be recorded into a computer-readable recording medium and then read into and executed by a computer system so that the various processes relating to photographing of a moving body using the moving body photographing system 1 are carried out. It is to be noted that the "computer system" here may include hardware such as an OS and peripheral apparatus. Further, the "computer system" includes a homepage providing an environment (or a displaying environment) in a case wherein the WWW system is utilized. Further, the "computer-readable recording medium" is a storage device such as a writable nonvolatile memory such as a flexible disk, a magneto-optical disk, a ROM or a flash memory, a portable memory such as a CD-ROM, or a hard disk or the like built in a computer system.

Further, the "computer-readable recording medium" includes a recording medium that retains a program for a fixed period of time like an internal volatile memory (for example, a DRAM (Dynamic Random Access Memory)) of a server or a computer system that becomes a client in the case where the program is transmitted through a network such as the Internet or a communication line such as a telephone line. Further, the program may be transmitted from a computer system wherein the program is stored in a storage device or the like to a different computer system through a transmission medium or through a transmitted wave in a transmission medium. The "transmission medium" through which the program is transmitted is a medium having a function of transmitting information like a network (communication network) such as the Internet or a communication circuit (communication line) such as a telephone circuit. Further, the program may be for implementing some of the functions described hereinabove. Furthermore, the program may be a program that can implement the above-described functions by a combination with a program recorded already in the computer system, namely, a difference file (difference program).

Further, while, in the present embodiment described above, a case is described in which the moving body approach decision section 220 is provided in the management apparatus 20, the apparatus that includes the moving body approach decision section 220 is not limited to the embodiment of the present invention, but another configuration wherein, for example, the moving body approach decision section 220 is provided in the photographing apparatus 30 may be adopted. In this instance, a notification of information representing that a motorcycle approaches the photographing apparatus 30 is not issued from the client management section 210 to the moving body photographing application through the photographing apparatus management section 200 but issued from the moving body approach decision section 220 to the moving body photographing application. Further, the other components of the photographing apparatus 30 are configured such that they are started up in response to the information outputted from the moving body approach decision section 220 and representing that a motorcycle approaches the photographing apparatus 30, and the photographing controlling section 300 acquires information of setting of photographing and so forth from the photographing apparatus management section 200.

Although the embodiment of the present invention has been described with reference to the drawings, the particular configurations are not restricted to the present embodiment but various alterations are included without departing from the subject matter of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A moving body photographing system wherein a portable terminal which moves together with a moving body and photographing means communicate with each other to photograph the moving body in a state wherein the moving body is moving, said moving body photographing system comprising:

reservation means for reserving photographing of the moving body in a state wherein the moving body is moving by the moving body photographing system by inputting a condition when the moving body is to be photographed to the portable terminal; and communication means for transmitting information representing the condition inputted to the portable terminal and information representing a position of the portable terminal to the photographing means, the photographing means including:

moving body position measurement means for measuring a position of the moving body moving together with the portable terminal, said moving body position measurement means including at least three or more access points of a wireless signal; and a camera apparatus for photographing the moving body in accordance with the condition inputted to the portable terminal based on the position information of the moving body measured by the moving body position measurement means, said portable terminal comprising a wireless communication means for wireless LAN communication, the moving body position measurement means transmitting a wireless signal from the individual access points and measuring the position of the moving body based on some of the transmitted wireless signals and a response signal transmitted from the communication means in response to the wireless signals, wherein said moving body positioning means measures the position of the moving body by a wireless LAN position measurement.

2. The moving body photographing system according to claim 1, wherein:

the portable terminal further includes photographing condition setting means for inputting photographing condition information including one or both of a composition and an effect when the moving body is to be photographed; and the communication means transmits the photographing condition information inputted to the photographing condition setting means to the photographing means.

3. The moving body photographing system according to claim 2, wherein:

the photographing means further includes photographing controlling means for controlling photographing by the camera apparatus;

the camera apparatus is installed such that a photographing direction can be varied under the control of the photographing controlling means; and the photographing controlling means controls, based on the photographing condition information transmitted thereto, the photographing by the camera apparatus so as to photograph the moving body by a photographing method in accordance with the direction suitable for the composition when the moving body is to be photographed and the effect.

4. The moving body photographing system according to claim 3, wherein:

the photographing controlling means outputs, based on the position information of the moving body measured by the moving body position measurement means, a shutter timing signal for causing the camera apparatus to start photographing at a timing before the position of the moving body comes to a position at which the composition coincides with the composition for photographing the moving body; and the camera apparatus successively takes a plurality of photographs for a period of time until a predetermined number of photographs are taken or for a period of time determined in advance after the shutter timing signal is inputted.

5. The moving body photographing system according to claim 2, wherein the moving body photographing system provides the composition that can be selected from at least one of "up" wherein the moving body enters in a large size into a frame of the camera apparatus, "normal" wherein the moving body enters in a middle size into a frame of the camera apparatus and "wide" wherein the moving body enters in a rather small size into a frame of the camera apparatus.

6. The moving body photographing system according to claim 2, wherein the moving body photographing system provides a photographing direction as the composition that can be selected from at least one of a "front" view wherein the moving body is imaged substantially from the front, an "oblique front" view wherein the moving body is imaged from an oblique front, a "side" view wherein the moving body is imaged substantially from the side, an "oblique rear" view wherein the moving body is imaged from an oblique rear and a "rear" view wherein the moving body is imaged from the rear.

7. The moving body photographing system according to claim 2, wherein the moving body photographing system provides a curve traveling position as the composition that can be selected from at least one of an "approach" view wherein the moving body which is a target for photographing approaching a curve, a "curve first half" view wherein the target is traveling at a position of approximately one fourth of the curve, a "curve middle stage" view wherein the target is running at a middle position of the curve, a "curve latter half" view wherein the target is traveling at a position of approximately three fourth of the curve, and an "escape" view wherein the target is going out from the curve.

8. The moving body photographing system according to claim 2, wherein the moving body photographing system provides the effect that can be selected from at least one of a "normal" speed wherein a shutter speed of the camera apparatus is set to a high speed so that both of the moving body and a background are photographed clearly, a "panning" speed wherein, while the background is panned, the moving body is photographed clearly, a "low speed shutter" speed wherein the background is photographed clearly while the moving body is panned, a "zoom during exposure" wherein a zooming operation is carried out within an exposure period before the shutter closes after the shutter opens, and a "light trail," which is only for photographing at night, wherein the background is fixed and the shutter is left in an open state to photograph a locus of a lighting unit of the moving body.

9. The moving body photographing system according to claim 2, wherein an installation position of the portable terminal is selected from the group consisting of a "rider" wherein a user of the moving body photographing system carries the portable terminal, an "around meter" wherein the portable terminal is attached around a meter of a motorcycle of the user, a "pocket" wherein the portable terminal is accommodated into an accommodation space at a front portion of the motorcycle, an "under seat" wherein the portable terminal is accommodated into an accommodation space below a seat of the motorcycle and a "vehicle body rear portion" wherein the portable terminal is attached to a rear portion of the motorcycle.

10. A moving body photographing apparatus for communicating with a portable terminal that moves together with a moving body to photograph the moving body in a state in which the moving body is moving, comprising:

moving body position measurement means for measuring a position of the moving body that moves together with the portable terminal, said moving body position measurement means including at least three or more access points of a wireless signal; and a camera apparatus for photographing the moving body in accordance with a condition when the moving body is to be photographed transmitted from the portable terminal based on position information of the moving body measured by the moving body position measurement means, said portable terminal comprising a wireless communication means for wireless LAN communication, the moving body position measurement means transmitting a wireless signal from the individual access points and measuring the position of the moving body based on some of the transmitted wireless signals and a response signal transmitted from the communication means in response to the wireless signals,
wherein said moving body position measurement means measures the position of the moving body by a wireless LAN position measurement.

11. The moving body photographing apparatus according to claim 10, and further comprising moving body approach decision means for deciding whether or not the portable terminal exists within a range determined in advance based on the position information of the portable terminal.

12. The moving body photographing apparatus according to claim 11, wherein:
the portable terminal includes wireless communication means;
the moving body position measurement means includes at least three or more access points of a wireless signal; and
the moving body position measurement means transmits a wireless signal from the individual access points and measures the position of the moving body based on some of the transmitted wireless signals and a response signal transmitted from the communication means in response to the wireless signals.

13. The moving body photographing apparatus according to claim 12, wherein:
the wireless communication by the wireless communication means is a wireless LAN communication; and
a measurement method for the moving body is a wireless LAN position measurement.

14. A moving body photographing method wherein a portable terminal, which comprises a wireless communication means for wireless LAN communication and moves together with a moving body, and photographing means communicate with each other to photograph the moving body in a state wherein the moving body is moving, said moving body photographing method comprising the following steps:
reserving by inputting a condition when the moving body is to be photographed to the portable terminal by a reservation means provided in the portable terminal for reserving photographing of the moving body in a state wherein the moving body is moving by a moving body photographing system;
communicating with a communication means provided in the portable terminal for transmitting information representative of the condition inputted to the terminal to the photographing means;
measuring a moving body position by a moving body position measurement means provided in the photographing apparatus, for measuring a position of the moving body that moves together with the portable terminal, said moving body position measurement means including at least three or more access points of a wireless signal;
transmitting a wireless signal from the individual access points and measuring the position measurement of the moving body based on some of the transmitted wireless signals and a response signal transmitted from the communication means in response to the wireless signals; and
photographing by using a camera apparatus provided in the photographing means photographs of the moving body in accordance with the condition inputted to the portable terminal based on the position information of the moving body measured by the moving body position measurement means,
wherein the moving body position measurement means measures the position of the moving body by a wireless LAN position measurement.

15. A moving body photographing program for causing a portable terminal that moves together with a moving body and photographing means to communicate with each other to photograph the moving body in a state wherein the moving body is moving, said program comprising:
a reservation step in which by inputting a condition when the moving body is to be photographed to the portable terminal, reservation means provided in the moving body photographing program reserves photographing of the moving body in a state wherein the moving body is moving by a moving body photographing system; and
a communication step for transmitting information representative of the condition inputted to the portable terminal to the photographing means,
the photographing means including:
moving body position measurement means for measuring a position of the moving body moving together with a portable terminal, said moving body position measurement means including at least three or more access points of a wireless signal,
said portable terminal comprising a wireless communication means for wireless LAN communication,
the moving body position measurement means transmitting a wireless signal from the individual access points and measuring the position of the moving body based on some of the transmitted wireless signals and a response signal transmitted from the communication means in response to the wireless signals,
wherein said moving body position measurement means measures the position of the moving body by a wireless LAN position measurement.

\* \* \* \* \*

UNITED STATES PATENT AND TRADEMARK OFFICE
CERTIFICATE OF CORRECTION

PATENT NO. : 8,891,950 B2  
APPLICATION NO. : 13/875478  
DATED : November 18, 2014  
INVENTOR(S) : Takahiro Oyama Page 1 of 1

It is certified that error appears in the above-identified patent and that said Letters Patent is hereby corrected as shown below:

ON THE TITLE PAGE:

At item (71), Applicant, change "Hondo Motor Co., Ltd., Tokyo (JP)" to --Honda Motor Co., Ltd., Tokyo (JP)--.

Insert the following:

--(30)    Foreign Application Priority Data

May 8, 2012    (JP) ................ 2012-106845--.

Signed and Sealed this
Twenty-first Day of April, 2015

Michelle K. Lee
*Director of the United States Patent and Trademark Office*